(12) United States Patent
Shin et al.

(10) Patent No.: US 11,437,829 B2
(45) Date of Patent: *Sep. 6, 2022

(54) METHOD TO CHARGE LITHIUM-ION BATTERIES WITH USER, CELL AND TEMPERATURE AWARENESS

(71) Applicant: THE REGENTS OF THE UNIVERSITY OF MICHIGAN, Ann Arbor, MI (US)

(72) Inventors: Kang G. Shin, Ann Arbor, MI (US); Liang He, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 670 days.

This patent is subject to a terminal disclaimer.

(21) Appl. No.: 15/335,556

(22) Filed: Oct. 27, 2016

(65) Prior Publication Data
US 2017/0256960 A1 Sep. 7, 2017

Related U.S. Application Data

(60) Provisional application No. 62/304,705, filed on Mar. 7, 2016.

(51) Int. Cl.
*H02J 7/00* (2006.01)
*H02J 7/04* (2006.01)

(52) U.S. Cl.
CPC ............ *H02J 7/0029* (2013.01); *H02J 7/008* (2013.01); *H02J 7/0071* (2020.01);
(Continued)

(58) Field of Classification Search
None
See application file for complete search history.

(56) References Cited

U.S. PATENT DOCUMENTS

| 5,028,860 A | 7/1991 | Amano |
| 5,172,044 A | 12/1992 | Sasaki et al. |

(Continued)

FOREIGN PATENT DOCUMENTS

| JP | 08-126222 A | 5/1996 |
| JP | 2010252474 A | 11/2010 |

(Continued)

OTHER PUBLICATIONS

Korean Office Action in counterpart KR Application No. 1020187028062, dated Sep. 3, 2021.*

*Primary Examiner* — Drew A Dunn
*Assistant Examiner* — Tynese V McDaniel
(74) *Attorney, Agent, or Firm* — Harness, Dickey & Pierce, P.L.C.

(57) ABSTRACT

Lithium-ion cells are widely used in various platforms, such as electric vehicles (EVs) and mobile devices. Complete and fast charging of cells has always been the goal for sustainable system operation. However, fast charging is not always the best solution, especially in view of a new finding that cells need to rest/relax after being charged with high current to avoid accelerated capacity fading. A user aware charging algorithm is proposed which maximizes the charged capacity within a user-specified available charging time (i.e., user-awareness) while ensuring enough relaxation (i.e., cell-awareness) and keeping cell temperature below a safe level.

16 Claims, 19 Drawing Sheets

(52) U.S. Cl.
CPC ...... *H02J 7/0091* (2013.01); *H02J 7/007192* (2020.01); *H02J 7/045* (2013.01)

(56) References Cited

U.S. PATENT DOCUMENTS

| | | |
|---|---|---|
| 5,254,931 A | 10/1993 | Martensson |
| 5,736,834 A * | 4/1998 | Kuno .................... H02J 7/0071 320/146 |
| 6,014,011 A | 1/2000 | DeFelice et al. |
| 6,087,810 A | 7/2000 | Yoshida |
| 6,342,774 B1 | 1/2002 | Kreisinger et al. |
| 7,388,383 B2 | 6/2008 | Kawakami et al. |
| 7,701,173 B2 | 4/2010 | Veselic |
| 7,800,343 B2 | 9/2010 | Aradachi et al. |
| 8,754,614 B2 | 6/2014 | Paryani et al. |
| 8,922,329 B2 | 12/2014 | Davis et al. |
| 2004/0232884 A1 | 11/2004 | Vaillancourt et al. |
| 2005/0035743 A1* | 2/2005 | Kawakami ......... G01R 31/3662 320/162 |
| 2006/0226815 A1 | 10/2006 | Gibbs et al. |
| 2007/0024246 A1 | 2/2007 | Flaugher |
| 2007/0075678 A1 | 4/2007 | Ng et al. |
| 2008/0183408 A1 | 7/2008 | Matsuura et al. |
| 2008/0278111 A1 | 11/2008 | Genies et al. |
| 2009/0243549 A1 | 10/2009 | Matsumura et al. |
| 2009/0295332 A1 | 12/2009 | Yang et al. |
| 2010/0033138 A1 | 2/2010 | Alger et al. |
| 2010/0127666 A1 | 5/2010 | Ball |
| 2010/0198536 A1 | 8/2010 | Hess |
| 2011/0245987 A1* | 10/2011 | Pratt ..................... H01M 10/44 700/295 |
| 2013/0141898 A1 | 6/2013 | Rooms et al. |
| 2014/0145684 A1* | 5/2014 | Liu ....................... H01M 10/44 320/152 |
| 2015/0229151 A1 | 8/2015 | Sudan et al. |
| 2015/0360578 A1* | 12/2015 | Duan .................... B60L 11/1861 340/455 |
| 2016/0322834 A1* | 11/2016 | Carpenter, Jr. ......... H02J 7/007 |

FOREIGN PATENT DOCUMENTS

| | | |
|---|---|---|
| JP | 5349243 B2 | 11/2013 |
| KR | 10-2004-0033278 A | 4/2004 |
| WO | WO 02/45238 | 6/2002 |
| WO | WO-2011011755 A2 | 1/2011 |

* cited by examiner

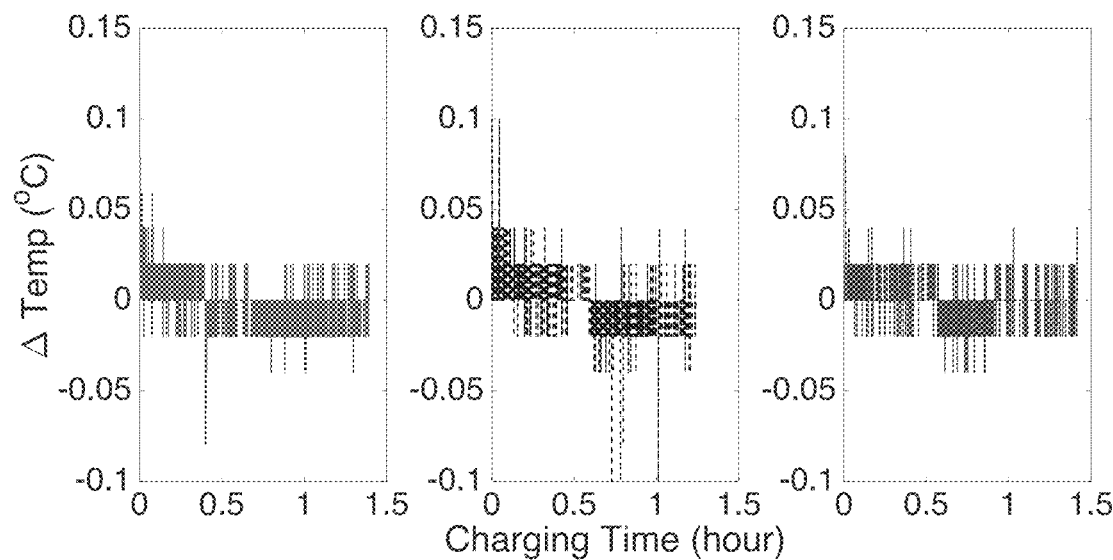
Fig. 18A-C
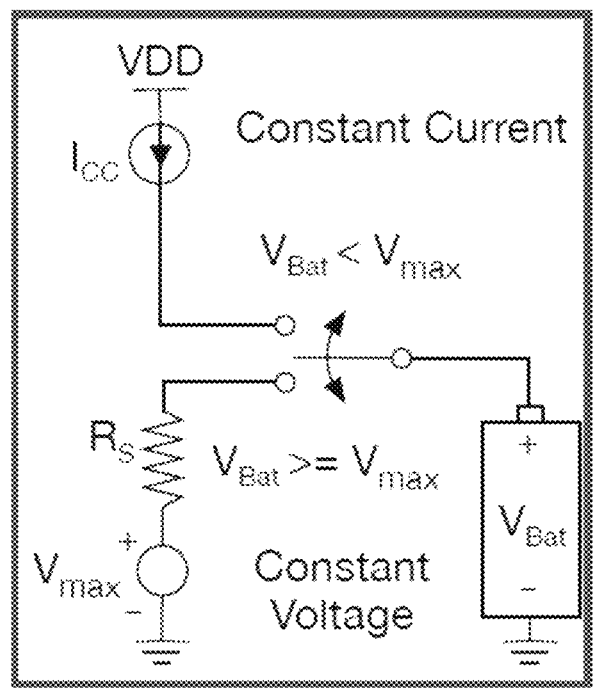
Fig. 19

METHOD TO CHARGE LITHIUM-ION BATTERIES WITH USER, CELL AND TEMPERATURE AWARENESS

CROSS-REFERENCE TO RELATED APPLICATIONS

This application claims the benefit of U.S. Provisional Application No. 62/304,705, filed on Mar. 7, 2016. The entire disclosure of the above application is incorporated herein by reference.

GOVERNMENT CLAUSE

This invention was made with government support under Grant No. CNS1446117 awarded by the National Science Foundation. The Government has certain rights in this invention.

FIELD

The present disclosure relates to a method for charging rechargeable batteries with user, cell and temperature awareness.

BACKGROUND

The excellent cycle life and high power density of lithium-ion cells have made them widely adopted in cyber-physical systems (CPSes) such as electric vehicles, and mobile devices such as tablets and smartphones. For example, the battery pack of Tesla S 85D vehicle is built with 7,104 Lithium-ion cells. Fast charging of battery cells has always been the goal to improve the sustainable system operation. Various fast charging technologies have been designated and implemented, significantly reducing the time to charge the cells.

However, fast charging is not always the best solution for at least the following reasons. First, even the state-of-the-art fast charging technologies still take hours to fully charge cells. For example, it takes ≈100 minutes to fully charge a QC 2.0 supported Galaxy S6 Edge smartphone, although about 75% of the charging can be completed in 50 minutes. This large charging time may be unacceptable when the user has only a limited time to charge the battery. Second, fast charging is not necessary in many cases because most users are likely to charge the battery in the night, which does not have to be fast. Moreover, the user may not need to fully charge the battery during the day time; capacity for the remainder of day-time usage could suffice. Third, fast charging heats cells rapidly, increasing the risk of safety issues such as thermal runaway causing fire or explosion. Lastly, fast charging accelerates the capacity fading of cells, which becomes even more pronounced because allowing cells to rest/relax for a certain time after charging with high current slows down their capacity fading. This new observation complements the conventional wisdom that relaxation-after-discharge improves the cycling performance of cells. Fast charging, with its typical charge-and-go scenario, does not allow such relaxation. Accelerated capacity fading shortens the life of cells, increasing the system operation cost, e.g., the electric vehicle battery pack costs $30-40 k and its warranty only covers limited capacity fading.

In this disclosure, the cell charging problem is addressed from a new perspective and aims to maximize the charged capacity within a user-specified available charging time while ensuring enough time for cell relaxation and keeping the cell temperature within a safe range, thus improving safety and capacity.

This section provides background information related to the present disclosure which is not necessarily prior art.

SUMMARY

This section provides a general summary of the disclosure, and is not a comprehensive disclosure of its full scope or all of its features.

A method is presented for charging a battery cell having lithium-ion composition. The method includes: receiving an user available time in which the battery cell is to be charged; determining a current charging time period for charging the battery cell with a constant current, where the determination of the current charging time period accounts for the user available time and a predefined time period for relaxing the battery cell; determining a threshold voltage to which the battery cell is to be charged with the constant current, where the threshold voltage is constrained by the current charging time period and the threshold voltage is less than a maximum voltage to which the battery cell can be charged to; and delivering a constant current to the battery cell until cell voltage of the battery cell reaches the threshold voltage.

The method further includes determining a secondary voltage which is to be applied to the battery cell during a secondary charging phase, where the secondary is constrained by the available time period and the secondary voltage is less than a maximum voltage to which the battery cell can be charged to; and applying a constant voltage to the battery cell until charging current for the battery cell falls below a cutoff limit, where the constant voltage is applied in response to detecting that the cell voltage equals the threshold voltage. The threshold voltage may also be constrained by a maximum safe temperature of the battery.

In another aspect, the method charging a battery cell having lithium-ion composition includes: receiving an user available time in which the battery cell is to be charged; determining a current charging time period for charging the battery cell with a constant current, where the determination of the current charging time period accounts for the user available time and a predefined time period for relaxing the battery cell; determining a threshold voltage to which the battery cell is to be charged with the constant current, where the threshold voltage is constrained by the current charging time period and the threshold voltage is less than a maximum voltage to which the battery cell can be charged to; and determining a secondary voltage which is to be applied to the battery cell during a secondary charging phase, where the secondary voltage is constrained by the available time period and the secondary voltage is less than a maximum voltage to which the battery cell can be charged to. The battery cell is then charged based in part on the threshold voltage and the secondary voltage. The threshold voltage may also be constrained by a maximum safe temperature of the battery.

In either method, the current charging time period can be determined by subtracting the predefined time period for relaxing the battery cell from the user available time.

In some embodiments, the threshold voltage is determined as being the largest possible threshold voltage that the charging of battery cell finishes within the user available time.

In other embodiments, the threshold voltage is determined as being the largest possible threshold voltage that the charging of battery cell finishes while keeping the cell temperature below a maximum safe level.

The threshold voltage can be determined by determining cell resistance of the battery cell; defining a search space from which to determine the threshold voltage based on the determined cell resistance; and searching the search space in a top-down manner to identifying the threshold voltage. More specifically, the search space is searched to identify a value for the constant voltage being applied to the battery cell. The searching continues by predicting the charging process using the identified threshold voltage and the identified value for the constant voltage, including an expected amount of time for delivering a constant current and an expected amount of time for delivering the constant voltage; determining whether sum of the expected amount of time for delivering a constant current and the expected amount of time for delivering the constant voltage exceeds the anticipated charging time; and lowering the value for the constant voltage in response to a determination that the sum of the expected amount of time for delivering a constant current and the expected amount of time for delivering the constant voltage exceeds the anticipated charging time.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 18A-18C are graphs illustrating temperature changes during charging of a mobile device FIG. 19 is a schematic depicting the implementation circuit schemata for CCCV;

Corresponding reference numerals indicate corresponding parts throughout the several views of the drawings.

DETAILED DESCRIPTION

Example embodiments will now be described more fully with reference to the accompanying drawings.

First, the necessary background on the charging of battery cells is presented. The performance of lithium-ion cells hinges critically on how fast they are charged/discharged, which in turn has to be defined with regard to their rated capacity; for example, a 200 mA charging current would be considered large for cells with 200 mAh rated capacity but small for 2,600 mAh cells. The charging (and discharging) currents of cells are often expressed in C-rate to capture this dependency. Specifically, taking cell discharging as an example, a 1C rate is the current that drains the cell completely in 1 hour, i.e., 200 mA for 200 mAh cells and 2,600 mA for 2,600 mAh cells.

Figure 1:
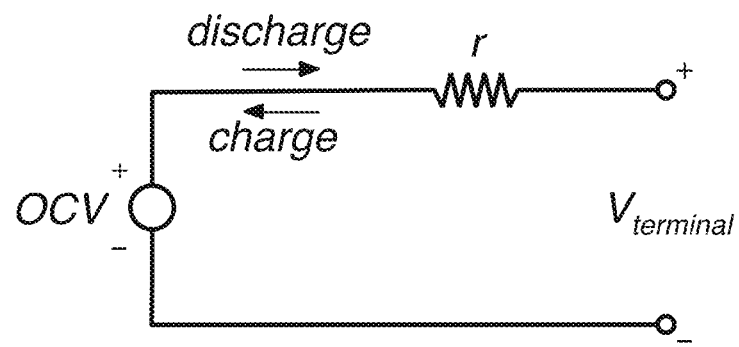
FIG. 1 is a schematic of a circuit model for a battery cell.

The open, circuit voltage (OCV) of a cell is the voltage between its terminals without load, which becomes the terminal voltage of the cell when the load is connected. In other words, OCV is an inherent property of the cell and the terminal voltage is what we can measure. The relationship between OCV and the terminal voltage can be described by the cell circuit model shown in FIG. 1:

$$V_{terminal} = OCV \pm I \cdot r, \quad (1)$$

where the cell is charged/discharged with current I, and r is the internal resistance of the cell. The term voltage is used when referring to the terminal voltage in the remainder of this disclosure.

Fast charging has always been the goal to improve the sustainable system operation. Based on the following three observations, fast charging is not always the best approach.

Figure 2A:
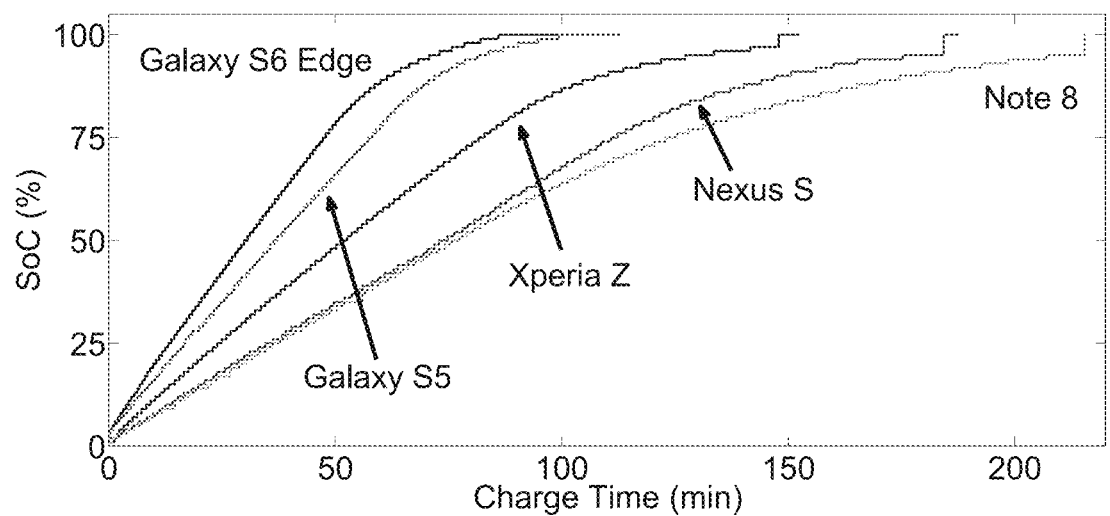
FIGS. 2A and 2B are graphs plotting the charging process of five different mobile devices with respective chargers.
Figure 2B:
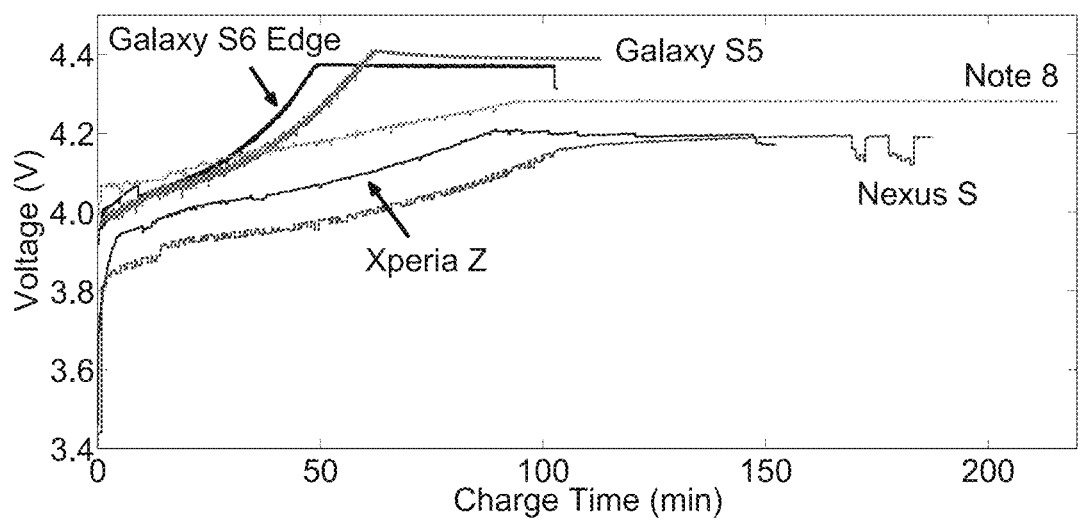

The first observation is that even the state-of-the-art fast charging technologies still take hours to fully charge the cells. FIGS. 2A and 2B plot the charging processes of five different mobile devices with their respective chargers: a Nexus S (2010), a Note 8.0 (2013), an Xperia Z (2013), a Galaxy 5S (2014), and a Galaxy S6 Edge (2015). The time to fully charge the devices has been shortened, e.g., from 3-4 hours for Nexus S to ≈2 hours for Galaxy S5. However, even the QC 2.0 supported Galaxy S6 Edge still takes ≈100 minutes to be fully charged. The QC 3.0 released in September 2015 is reported to take 35 minutes to charge the cell to 80%. Taking electric vehicle charging as another example, which emphasizes fast charging due to the range anxiety. Table 1 compares the three commonly seen electric vehicle charging technologies: Level 1-3 charging. Again, even the fastest Level-3 charging requires 30 min to charge the batteries to 80%. Clearly, these hour-order charging times may not be acceptable when the user has only limited time to charge the battery.

TABLE 1

Level 1-3 charging for electric vehicles.

| | Charge Power | Charge Current | Charge Time | Infrastructure Cost |
|---|---|---|---|---|
| Level-1 | 1.4 kW | 15-20 A | 10 hour to fully charge | $230-1,350 |
| Level-2 | 3.3 kW | Up to 80 A | 2-3 hour to fully charge | $2,600-21,000 |
| Level-3 | 50 kW | 120-500 A | 30 minutes to 80% | $25,000-85,000 |

Fast charging is not always needed with the usually over-designed battery capacity, especially in view of the fact that most users are likely to charge their batteries in the night. Again taking electric vehicle as an example. Statistics show that 80% of the users only drive ≤50 miles per day. On the other side of the story, electric vehicle battery packs are commonly rated with mileages over 200 miles, e.g., 270 miles for Tesla. S. This way, the EVs for most users are likely to "survive" the daily usage with a battery pack fully charged in the morning, and then charge them again in the night where Level-3 charge is not ready needed. Moreover, fully charging the battery may not be needed during the day time because the capacity will most likely exceed any day-time usage.

Thirdly, fast charging is not desirable for cells as it (i) increases cell temperature and thus the chance of thermal runaway, and (ii) leads to faster capacity fading, thus shortening the lifetime of cells and increasing the system operation cost. It is a common practice to conclude a cell as dead after its capacity fades to 80% of the rated level.

Fast charging is for Charge-and-Go scenario where the user wants her battery to be charged quickly and then get on her way. This application scenario does not allow cells to rest after charging but does accelerate their capacity fading and increase the chance of thermal runaway. This finding is demonstrated via measurements of two sets of Lithium-ion cells using a NEWARE battery tester. Table 2 below summarizes the cells details.

TABLE 2

Cells used in the measurements.

| | Set-I | Set-II |
|---|---|---|
| Brand | UltraFire | TENERGY |
| Number of Cells | 8 | 5 |
| Rated Capacity | 3,000 mAh | 2,600 mAh |
| Age | 2+ years | new |

Figure 4A:
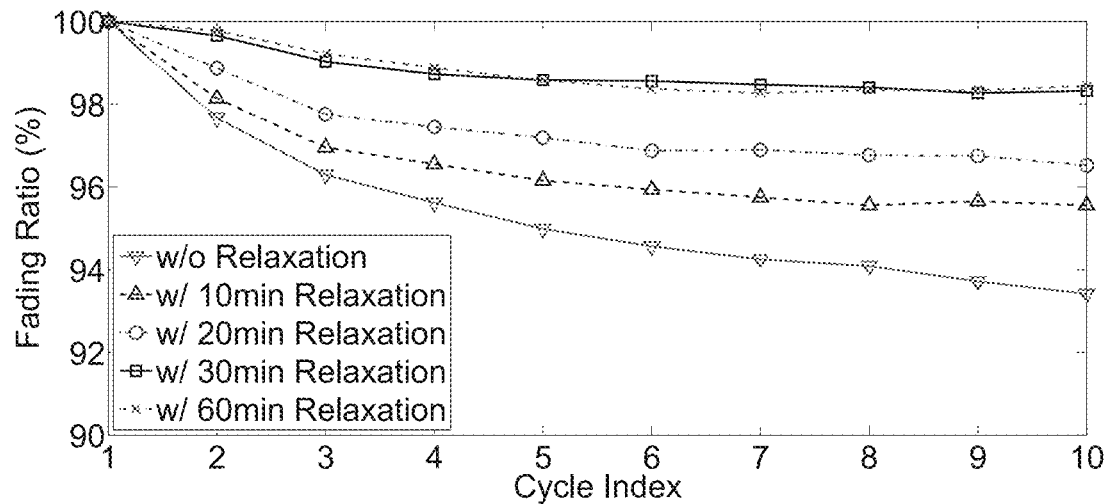
FIGS. 4A and 4B are graphs showing insufficient relaxation leads to accelerated cell capacity fading over ten cycles and twenty cycles, respectively.

In the first set of measurements, the Set-I cells were charged/discharged for 10 cycles with a charge/discharge current of ±500 mA, respectively. The charging terminates when the cell voltage reaches 4.1V and the discharging terminates when the voltage decreases to 3.0V. A rest period of 0-60 minutes is inserted between each charge and discharge. FIG. 4A plots the averaged capacity fading of these cells during these 10 cycles, normalized to the delivered capacity in the first cycle. The cell capacity degrades slower with longer relaxation, e.g., to 98.2% of the first cycle when relaxing cells for 30 minutes after each charge, much slower than the case without relaxation (i.e., 93.4%). However, an extremely long relaxation has diminishing effect on the slowdown of capacity fading, as observed from comparison of the cases with relaxation periods of 30 and 60 minutes.

Figure 4B:
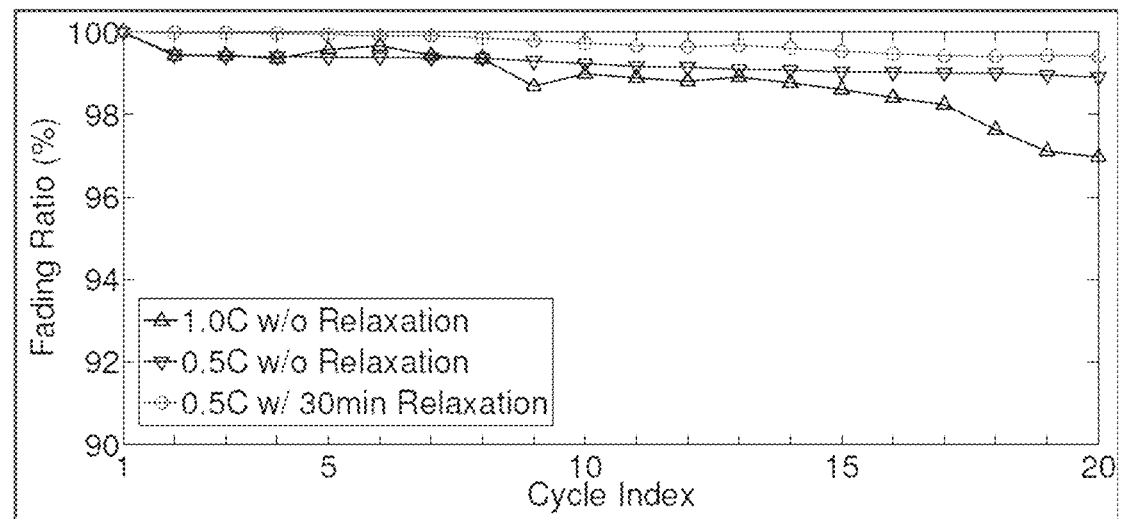

Similar cycling tests have been performed with Set-II cells as shown in FIG. 4B. Again, relaxing cells slows down their capacity fading. Also, comparison of the two cases with no relaxation reveals dramatic capacity fading when charging cells with higher current, reinforcing the necessity of relaxing cells after fast charging. Another observation is that relaxing cells to slow down their capacity fading is particularly crucial for aged cells, as revealed by comparison of FIGS. 4A and 4B. For this disclosure, it is assumed that the needed relaxation time for a given cell type is provided by the cell manufacturer or otherwise determined empirically.

These three observations reveal that fast charging is not always the best to charge cells because (i) fast charging is agnostic of real-time user requirements, e.g., the available charging time, and thus blindly pushes for high current charging even if unnecessary; (ii) fast charging ignores the needed relaxation of cells, leading to accelerated capacity fading. So, the cell charging problem is viewed from a new perspective and the aim is to maximize the charged capacity within the user-specified available charging time $T_{available}$ while ensuring a relaxation period to be no shorter than $T_{relax}$, and keeping cell temperature below a safe level $\theta_{safe}$, i.e., $$\max C_{total} \quad (2)$$

s.t. $t_{total} \leq T_{available}$ and $t_{relax} \geq T_{relax}$ and $\theta \leq \theta_{safe}$.

Resting cells is not desirable to maximize the charged capacity, albeit serving as relaxation. The second phase of the classic CCCV charge algorithm (i.e., constant voltage phase) can also serve as relaxation. Essentially, relaxation cools down the chemical reactions in the cells; otherwise, the oxidation of the electrolyte at the surface of cathode would form a resistive surface layer quickly. This also reduces the loss of active materials needed for the transformation between electrical and chemical energy. The essence of relaxation inspires one to gradually decrease the charging current that may serve as relaxation for cells, as in the constant voltage phase (CV-Chg) of the CCCV charge algorithm.

Figure 5:
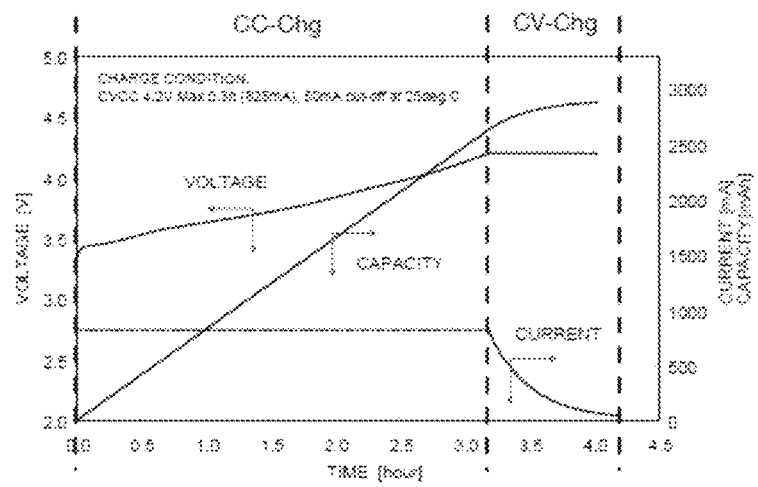
FIG. 5 is a graph showing the CCCV-based charging process.

CCCV is a classical charging method for lithium-ion cells, widely implemented in both high/low-ends and small large battery-powered systems. FIG. 5 illustrates the CCCV-based charging process, which can be described by $$<I_{cc}, V_{max}, I_{cutoff}>_{cccv}$$

and consists of the constant current phase (CC-Chg) first and then the constant voltage phase (CV-Chg). In the CC-Chg phase, the cell is charged with a large current $I_{cc}$ (e.g., 0.5-1.0 Amp) until its voltage reaches the maximum level $V_{max}$. Then, CV-Chg phase starts and charges the cell with a constant voltage $V_{max}$, gradually decreasing charging current due to the increase of cell OCV. The CV-Chg phase completes when the charging current reduces to a predefined cutoff level $I_{cutoff}$, e.g., 0.05 C. Both $I_{cc}$ and $I_{cutoff}$ are specified by the manufacturer for a particular model of cells, and $V_{max}$ is normally in the range of 4.20-4.25V. While reference is made throughout this disclosure to battery cells having lithium-ion chemistry, it is readily understood the techniques described herein are applicable to rechargeable cells having other types of chemistries.

Figure 6A:
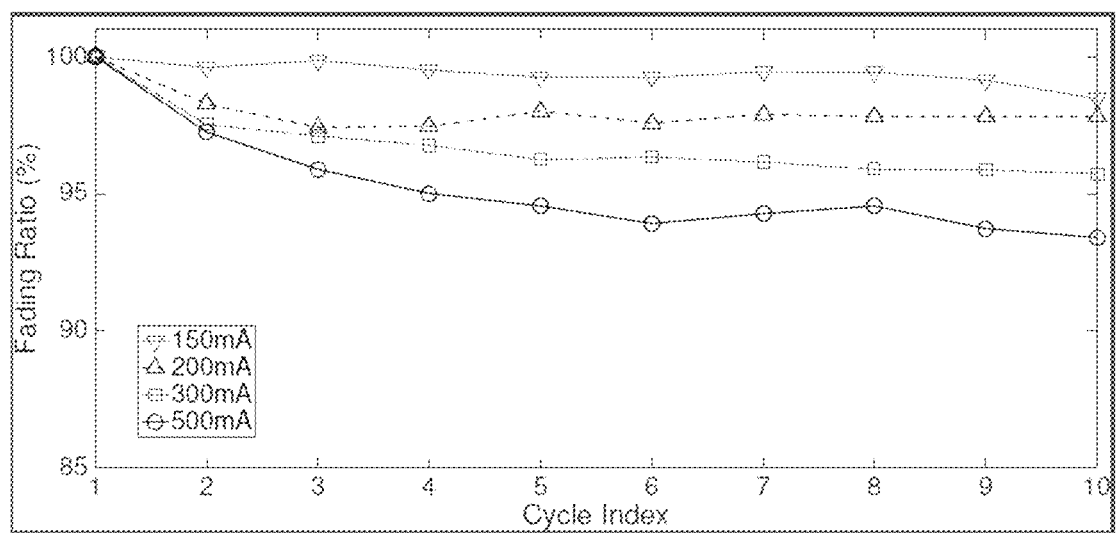
FIGS. 6A and 6B are graphs showing a completed CV-Chg cycle over ten and one hundred cycles, respectively.
Figure 6B:
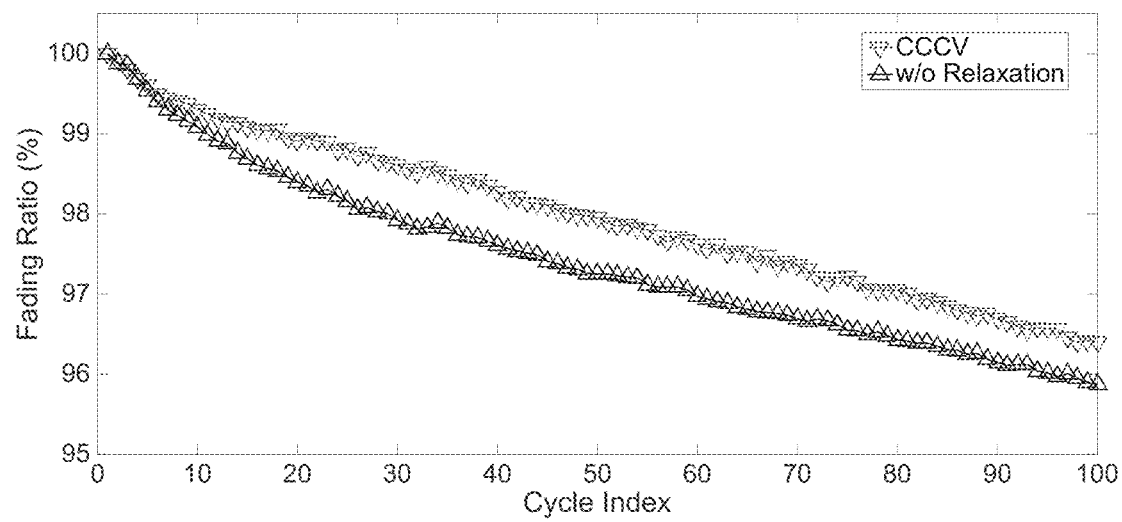

The decreasing charging current makes CV-Chg serve as relaxation. To validate this, the Set-I cells in Table 2 are charged with <500 mA, 4.2V, $I_{cutoff}>_{cccv}$ where $I_{cutoff}=\{150, 200, 300, 500\}$ mA, and then discharged with −500 mA current until their voltages decrease to 3.0V. The case of $I_{cutoff}=150$ mA corresponds to the specified cutoff current of the cell, i.e., 0.05 C, implying a completed CV-Chg. Specifically, a CV-Chg is completed if it terminates when the charging current decreases to the specified cutoff level. On the other hand, the cases with $I_{cutoff}=\{200, 300, 500\}$ mA indicate pre-terminated CV-Chg. Note that there is actually no CV-Chg with $I_{cutoff}=500$ mA. FIG. 6A plots the averaged capacity fading over 10 such charge/discharge cycles, showing that CV-Chg slows down the capacity fading of cells as it approaches completion, validating the conjecture that completed CV-Chg serves as relaxation. Similar cycling measurements have been performed with the Set-II cells and similar observations were obtained as seen in FIG. 6B.

Figure 7:
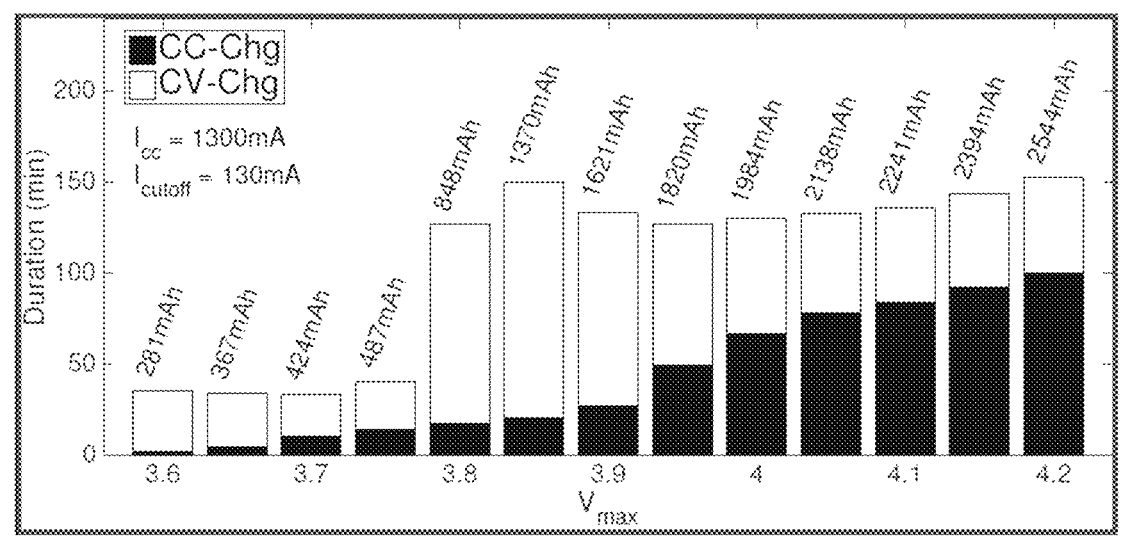
FIG. 7 is a graph showing that a smaller $V_{max}$ leads to less charged capacity but not necessarily a shorter charging time.

Relaxing cells with CV-Chg is more promising than resting them as more capacity can be charged. However, the original CCCV is designed to fully charge cells, which is likely to be infeasible with limited $T_{available}$. A simple mitigation is to use a smaller (but as large as possible) voltage level $V'_{max}$ to substitute $V_{max}$ in $<I_{cc}, V_{max}, I_{cutoff}>_{cccv}$, i.e., only partially charge the cell to ensure the charging process will complete within $T_{available}$. However, this approach may not work because charging less capacity to cells with CCCV does not necessarily lead to a shorter charging time. To demonstrate this, the CCCV approach is modified to charge a cell with varying $V'_{max}$. FIG. 7 compares the thus-collected charging durations and charged capacity—a smaller $V'_{max}$ does lead to less charged capacity, but not necessarily a shorter charge time. This finding needs to be reasoned with two aspects: the nonlinear relation between the OCV and depth-of-discharge (DoD) of cells and the role $V_{max}$ plays in CCCV. DoD describes the cell capacity that has been discharged as a percentage of its maximum capacity $C_0$.

Figure 8A:
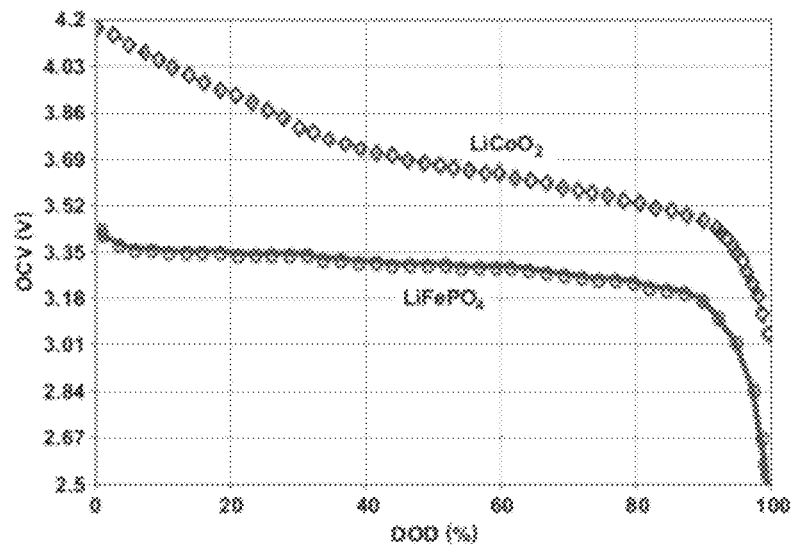
FIGS. 8A and 8B are graphs showing the OCVs and DoDs of cells, respectively, demonstrate reliable but nonlinear relationship.
Figure 8B:
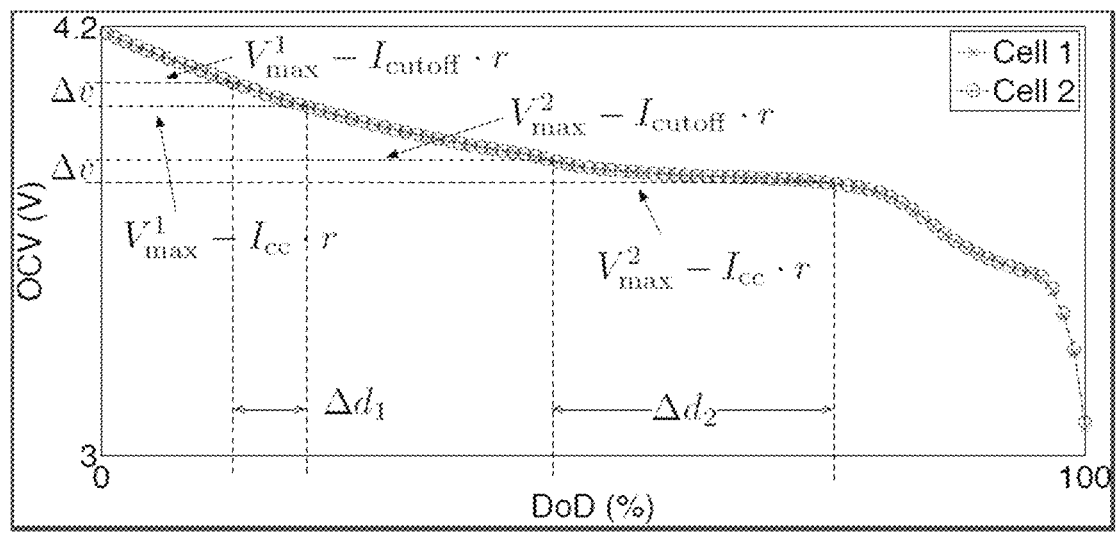

Lithium-ion cells demonstrate a monotonic relationship between their OCVs and DoDs as shown in FIG. 8A. This relationship is stable for cells of the same chemistry and does not vary much with manufacturer (e.g., <5 mV variances in OCV with given DoD). Also, this relationship is available in the form of an OCV DoD table in many off-the-shelf battery management chips, such as bq2750x from TI. FIG. 8B plots the empirically obtained OCV-DoD curves with two cells, whose closeness validates the stable relationship. $\mathbb{D}(v)$ and $\mathbb{C}(d)$ are used to refer to the mapping between cell DoD and OCV in the rest of this disclosure.

FIG. 8 also shows that the OCV-DoD relation is not linear. Specifically, the OCVs are more sensitive to DoDs when cells are nearly fully charged (e.g., below 20% DoD) or completely discharged (e.g., approaching 100% DoD), but are not so sensitive in certain middle ranges, e.g., between 40-80% DoD.

$V_{max}$ plays two roles in CCCV by answering two questions: when should CC-Chg terminate and how to charge during CV-Chg? Specifically, the following details of CC-Chg and CV-Chg are known when using $<I_{cc}, V_{max}, I_{cutoff}>_{cccv}$ to charge a cell with initial OCV $v_0$ (and an initial DoD $d_0=\mathbb{D}(v_0)$) and internal resistance r. A constant r is assumed during the charging process for the ease of description, which will be elaborated on later.

CC-Chg is responsible for charging the cell from OCV $v_0$ to $v_{cc}=V_{max}=V_{max}-I_{cc}\cdot r$, and thus the capacity charged during CC-Chg is $$C_{cc}=(\mathbb{D}(v_0)-\mathbb{D}(v_{cc}))\cdot C_0/100,$$

where $C_0$ is the total capacity of the cell upon being fully charged. CC-Chg last for $$T_{cc}=C_{cc}/I_{cc}.$$

After CC-Chg, CV-Chg is responsible for further charging the cell from OCV $v_{cc}$ to $v_{cv}=V_{max}-I_{cutoff}\cdot r$. The capacity charged during CV-Chg is $$C_{cv}=(\mathbb{D}(v_{cc})-\mathbb{D}(v_{cv}))\cdot C_0/100.$$

The time is discretized into unit slot $\delta_t$. CV-Chg starts with a charging current of $I_1^{cv}=I_{cc}$. After the first time slot, the cell DoD decreases to $$d_1^{cv}=\mathbb{D}(v_{cc})-100\cdot\delta_t\cdot I_{cc}/C_0,$$

and its OCV rises to $$v_1^{cv}=\mathbb{C}(d_1^{cv}).$$

This way, the charge current reduces to $$I_2^{cv}=(V_{max}-v_1^{cv})/r$$

during the second time slot. The process continues until the charging current decreases to $I_{cutoff}$. This way, CV-Chg duration $T_{cv}$ can be calculated iteratively.

Now, consider the case when reducing $V_{max}$ from $V_{max}^1$ to $V_{max}^2$ ($V_{max}^1>V_{max}^2$). The OCV range within which CC-Chg applies shrinks from $[v_o, V_{max}^1-I_{cc}\cdot r]$ to $[v_o, V_{max}^2-I_{cc}\cdot r]$, leading to less to-be-charged capacity and shorter CC-Chg duration. However, the OCV ranges to which the CV-Chg is responsible are $$[V_{max}^1-I_{cc}\cdot r, V_{max}^1-I_{cutoff}\cdot r],$$

and $$[V_{max}^2-I_{cc}\cdot r, V_{max}^2-I_{cutoff}\cdot r],$$

before and after the charge, respectively. These OCV ranges may map to very different DoD intervals (and thus to-be-charged capacities) because of the nonlinear OCV-DoD table, although sharing the same OCV gap, i.e., $(I_{cc}-I_{cutoff})\cdot r$. This is illustrated in FIG. 8B where the same magnitude of OCV change (i.e., $\Delta v$) leads to significantly different magnitudes of DoD changes (i.e., $\Delta d_1 \ll \Delta d_2$). Thus, reducing $V_{max}$ shortens CC-Chg because of its first role, but may lead to longer CV-Chg with its second role (e.g., as in FIG. 7)—the overall charging time is not necessarily reduced. To address this discrepancy between the charging time and charged capacity, applicant proposes to separate the two roles of $V_{max}$ by introducing another control parameter as will be explained further below.

Figure 9:
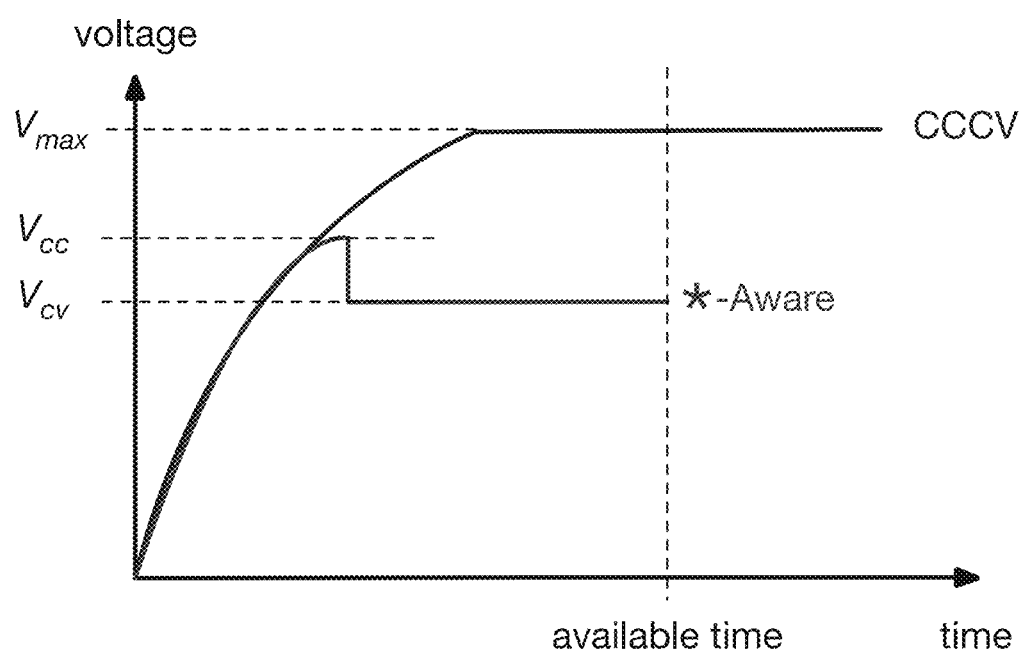
FIG. 9 is a graph illustrating the proposed user aware charging process.

Besides the functional requirements on the charged capacity and charging time, simplicity is an important requirement for charging algorithms to facilitate their wide adoption. FIG. 9 illustrates a proposed user aware charging algorithm and compares it with that of CCCV. The proposed user aware charging algorithm is an extended version of CCCV—a two-phase charging algorithm described by $$<I_{cc}, V_{cc}, V_{cv}, I_{cutoff}>_{-AWARE}(V_{cc} \geq V_{cv}).$$

Specifically, the user aware charging algorithm based charging process starts with CC-Chg with current $I_{cc}$ until the cell voltage rises to $V_{cc}$, and then CV-Chg charges the cell with voltage $V_{cv}$ until the charging current falls to $I_{cutoff}$. This way, $V_{cc}$ plays the first role of the original $V_{max}$ in controlling CC-Chg and $V_{cv}$ takes the second role of $V_{max}$ in controlling CV-Chg. The problem formulation can be refined as $$\max C_{total} = C_{cc} + C_{cv} \quad (3)$$

$$s.t. \ T_{cc} + T_{cv} \leq T_{available} \quad (4)$$

$$T_{cc} \leq T_{available} - T_{relax} \quad (5)$$

$$\theta \leq \theta_{safe}. \quad (6)$$

Thus, the basic principle of the proposed user aware charging algorithm is to identify the optimal combination of $V_{cc}$ and $V_{cv}$.

Furthermore, it is known that $$\max C_{total} = C_{cc} + C_{cv} \Leftrightarrow \max V_{cv} \quad (7)$$

as $V_{cv}$ determines the final OCV of the cell after charging, which is monotonic in the DoD of cells. Similarly, the constraint can be transformed to $$T_{cc} \leq T_{available} - T_{relax} \Leftrightarrow C_{cc} = \quad (8)$$
$$C_{cc,max} = (T_{available} - T_{relax}) \cdot I_{cc} \Leftrightarrow d_{cc} \geq d_{cc,min} =$$
$$\max\left\{d_0 - \frac{C_{cc,max}}{C_0} \times 100\%, 0\right\} \Leftrightarrow V_{cc} \leq \mathbb{O}(d_{cc,min}) + I_{cc} \cdot r.$$

Figure 10:
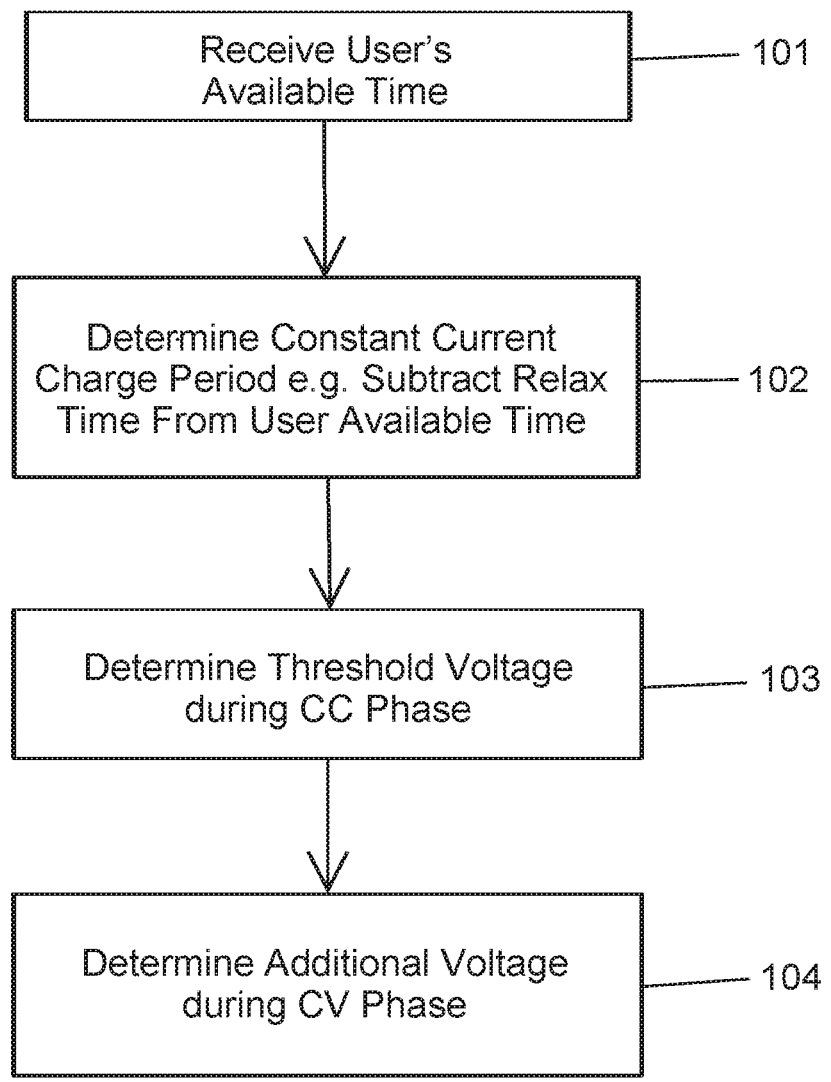
FIG. 10 is a flowchart depicting steps of the proposed user aware charging process.

FIG. 10 provides an overview of the proposed user-aware method for determining how to charge one or more rechargeable battery cells, such as those having a lithium-ion chemistry. An available amount of time or a target charging time is first received at 101 as an input. This input represents the amount of available time in which the battery cell can be charged. The maximum charged capacity within the user specified time is determined while ensuring enough time for relaxation.

Given the user specified time, a duration for charging the battery cell with a constant current is determined at 102, where the determination of the current charging period accounts for the user specified time and a predefined time period for relaxing the battery cell. In one embodiment, this current charging period is determined by subtracting the predefined time period for relaxing the battery cell from the user-specified time.

Next, a threshold voltage $V_{cc}$ to which the battery cell can be charged to with the constant current is determined as indicated at 103. The threshold voltage is less than a maximum voltage to which the battery cell can be charged to and is constrained by the current charging time period as will be further described below. A secondary voltage $V_{cv}$ which is to be applied to the battery cell during a secondary charging phase is also determined at 104. Likewise, the secondary voltage is less than a maximum voltage to which the battery cell can be charged to and is constrained by the available time period as will be further described below. The classical CCCV charging algorithm is modified to use the threshold voltage during the constant current charging phase and the secondary voltage during the constant voltage charging phase.

Figure 11:
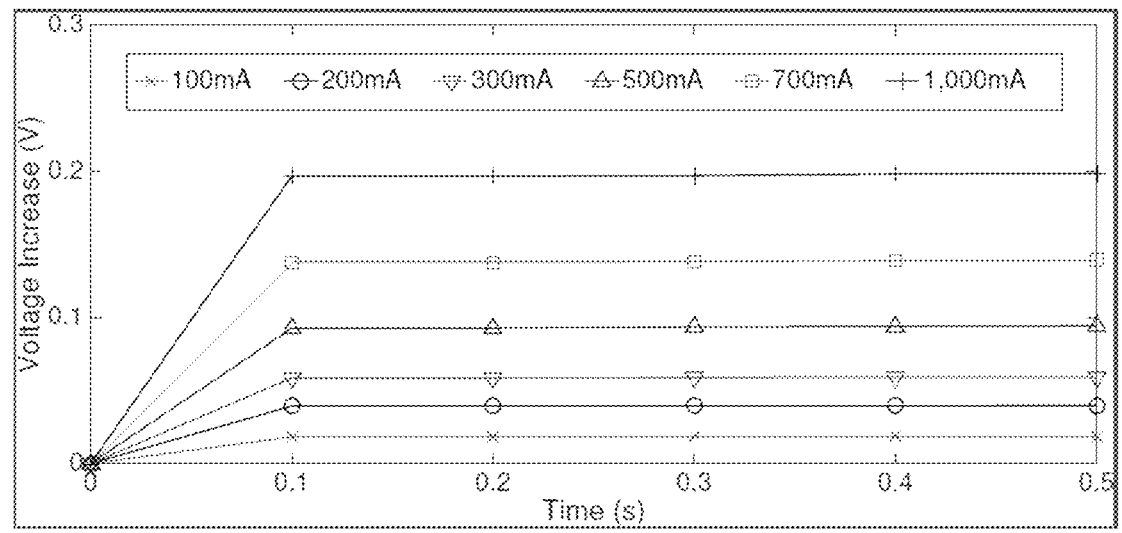
FIG. 11 is a graph showing voltage responses when charging a cell with different currents.

More specifically, the first component in the proposed user-aware charging algorithm is to predict the charging process with given $V_{cc}$ and $V_{cv}$, i.e., determining values for $T_{cc}$, $C_{cc}$, $T_{cv}$, and $C_{cv}$. The basic prediction principle is based on the OCV-DoD table for which the cell resistance r is needed. The user aware charging algorithm estimates the cell resistance based on basic physics r=V/I. For example, short current pulses are input into the cell and its voltage responses are recorded before actually charging it. This way, the cell resistance can be estimated by r=ΔV/I where ΔV is the increase of cell voltage and I is the input current. FIG. 11 shows the voltage responses of a cell with different current pulses—the voltage increases quickly during the first 0.1 s because of the I·r voltage and then increases slowly due to the charging of the cell. The quick response of the I·r voltage allows the proposed user-aware charging algorithm to estimate r with little overhead, e.g., r=0.19Ω for the cell in FIG. 11. The proposed charging algorithm uses the estimated r to predict the charging process with $V_{cc}$ and $V_{cv}$. Other techniques for estimating the internal resistance are also contemplated by this disclosure.

Figure 12:
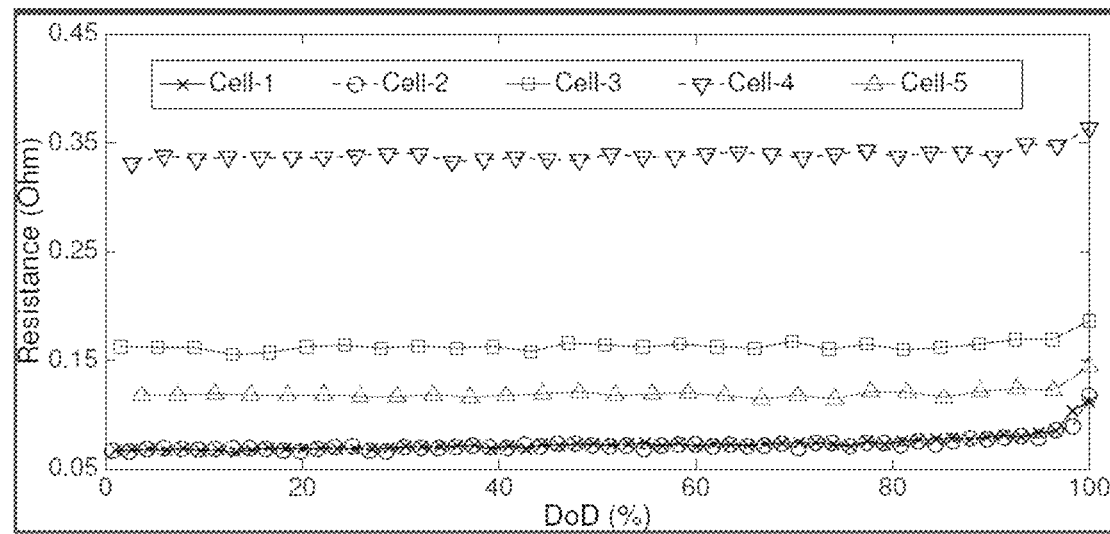
FIG. 12 is a graph showing how the cell resistance shows small variations throughout the charging process.

However, cell resistance is known to be variable during charging. To gain more insight on this, five cells are intermittently charged to estimate their r in real time throughout the charging process—charging the cells with constant current for 10 s and then stop the current for 10 s, repeat the process until the cell voltage reaches 4.2V. FIG. 12 plots the thus-collected resistance traces, which are indeed not constant. However, the variations of cell resistance are small except when the cells are of extreme high DoDs, or when they are nearly completely discharged.

Figure 13:
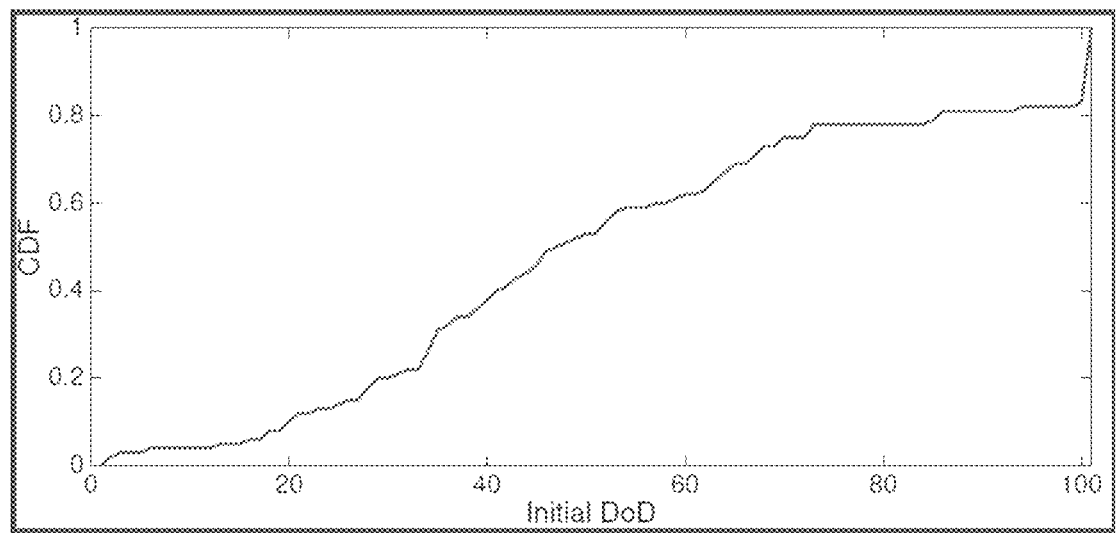
FIG. 13 is a graph showing how mobile devices are often charged before being completely discharged.

For battery-powered systems such as mobile devices and EVs, users typically charge the system before completely draining its battery. A usage trace has been collected for a Galaxy S6 Edge for 29 days. FIG. 13 plots the distribution of battery DoDs when the charging of the phone begins during the recorded periods—the phone is charged before its battery reaches 80% DoD in more than 80% of all the cases. For EVs, the studies show EVs are normally charged before their batteries reach 70% DoD. These observations indicate that charging cells with extreme high initial DoDs is not common in practice. Thus, it is reasonable for the proposed charging algorithm to predict the charging process with the before-charge-r.

Next, optimal values are identified for the threshold voltage $V_{cc}$ and the secondary voltage $V_{cv}$. In an example embodiment, a search space is defined from which to determine the optimal values and then the search space is searched as further described below. Other techniques for determining the optimal values for the threshold voltage $V_{cc}$ and the secondary voltage $V_{cv}$ fall within the broader aspects of this disclosure.

Figure 14:
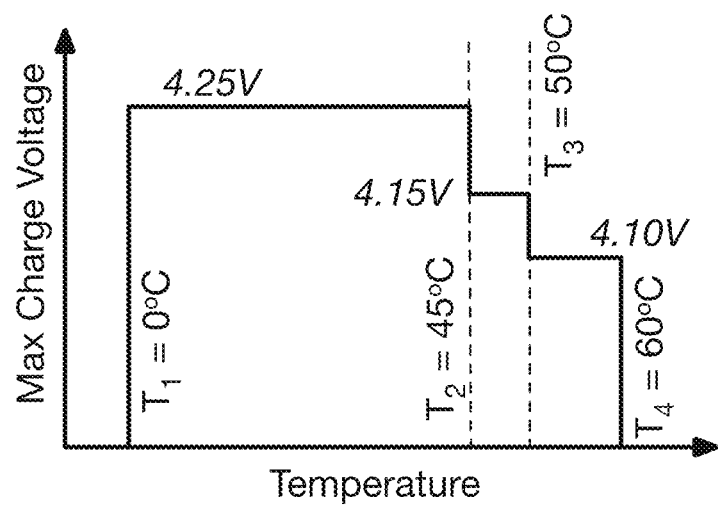
FIG. 14 is a graph showing the maximum safe charge voltage of lithium-ion cells in relation to temperature.

FIGS. 16A-16F illustrates constraints which may be placed on the search space to achieve a reduced search space. The search space for $V_{cc}$ and $V_{cv}$ can be reduced as follows. First, there are constraints on the maximum voltage to charge cells safely ($V_{safe,max}$), for example as specified by JEITA and as shown in FIG. 14.

Second, a voltage higher than the cell OCV is required to charge the cell. At the beginning of the charging process, this means that the charging voltage has to be higher than the cell's initial OCV $v_0$. This lower bound of the charging voltage is tightened further to ($v_0 + I_{cc} \cdot r$) to achieve the CC-Chg current $I_{cc}$. Combining with the maximum safe charge voltage, it is known that $$v_0 + I_{cc} \cdot r \leq V_{cv} \leq V_{cc} \leq V_{safe,max}. \quad (9)$$

Furthermore, when switching from CC-Chg to CV-Chg, this observation requires $$V_{cv} - (V_{cc} - I_{cc} \cdot r) \geq I_{cutoff} \cdot r;$$

otherwise, there will be no CV-Chg. After rearranging terms, one gets $$V_{cc} - (I_{cc} - I_{cutoff}) \cdot r \leq V_{cv} \leq V_{cc}. \quad (10)$$

Figure 15A:
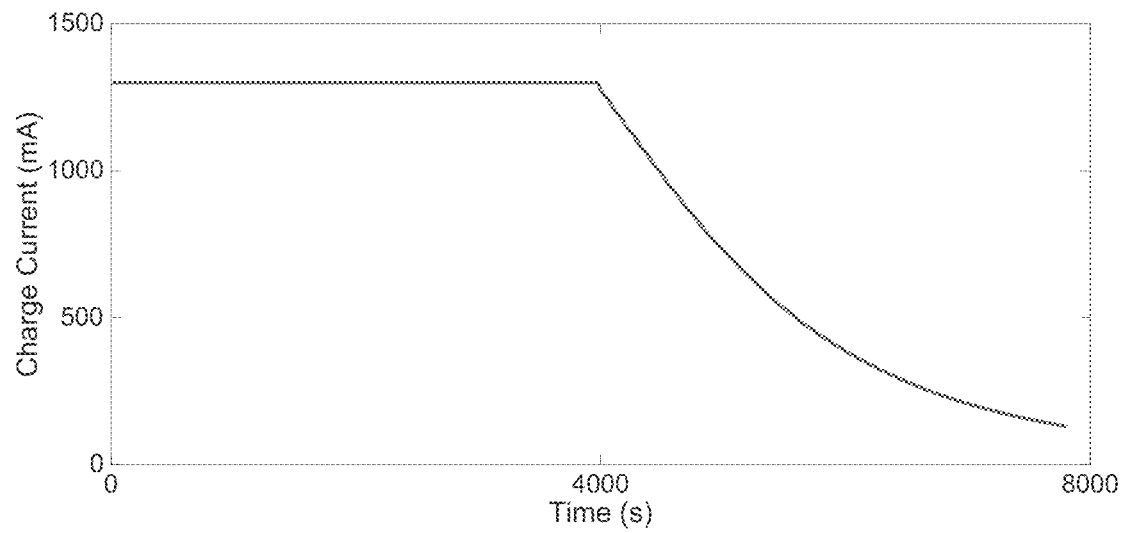
FIG. 15A-15C are graphs showing how the charging current during CV-Chg fits a two-term exponential model.
Figure 15B:
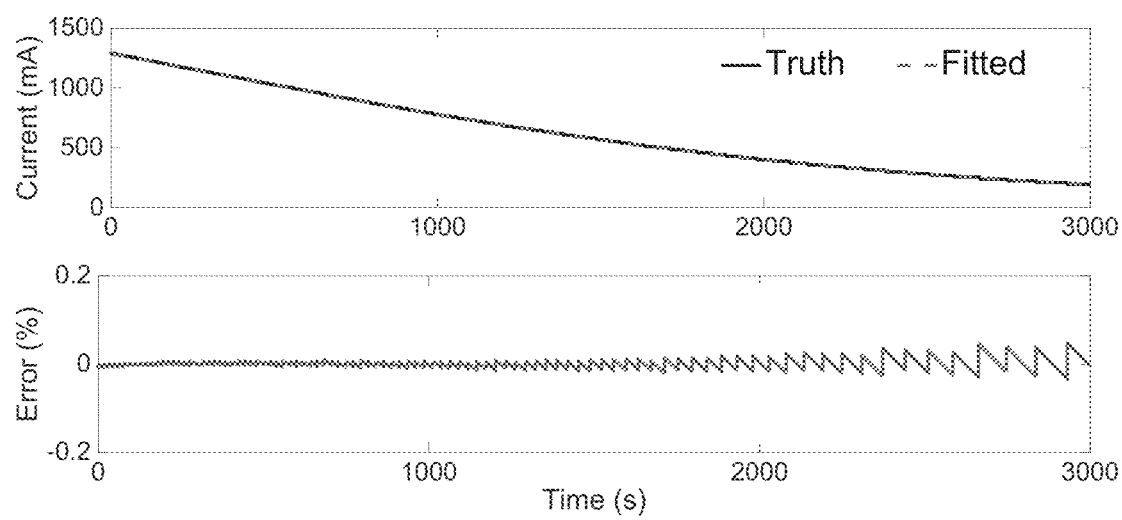
Figure 15C:
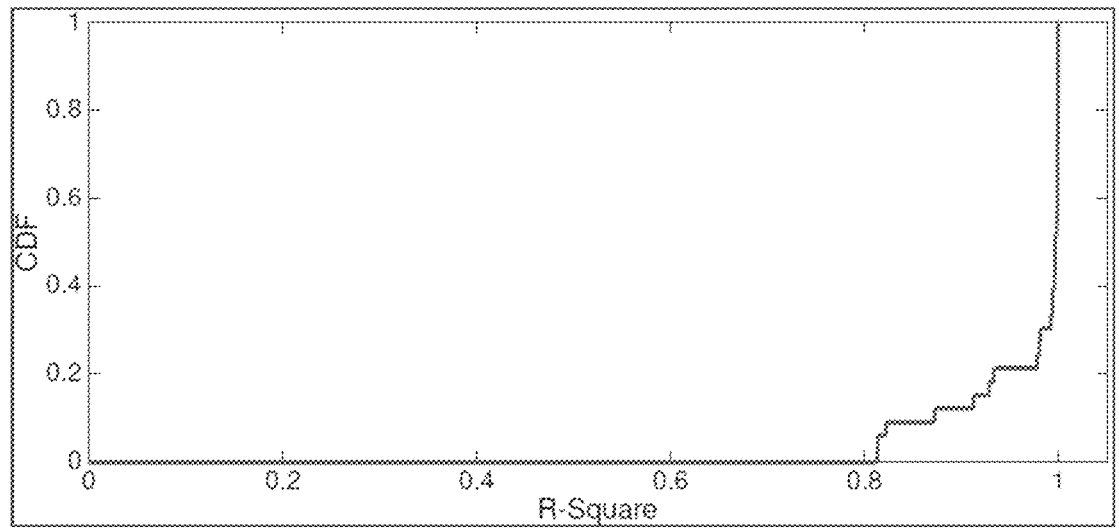
Figure 16A:
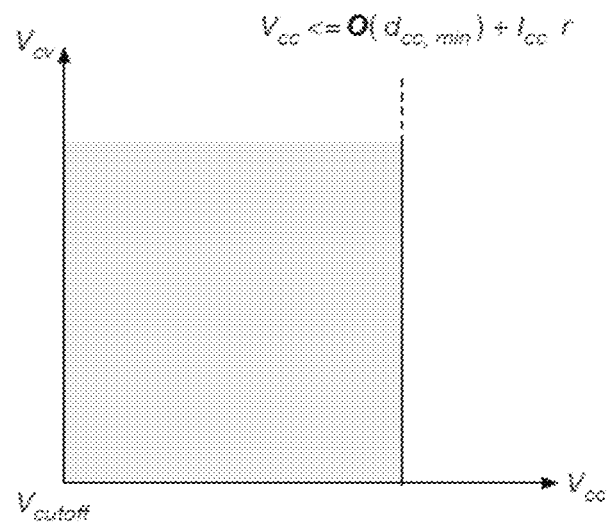
FIGS. 16A-16F are graphs showing how different constraints form a reduced search space.
Figure 16B:
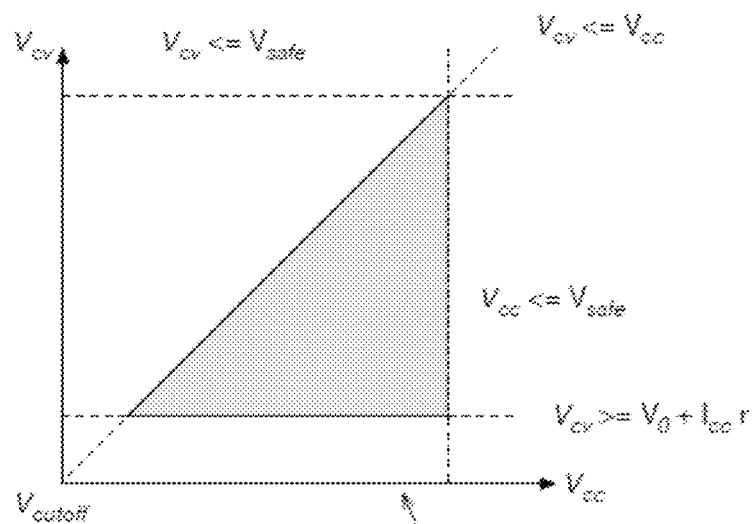
Figure 16C:
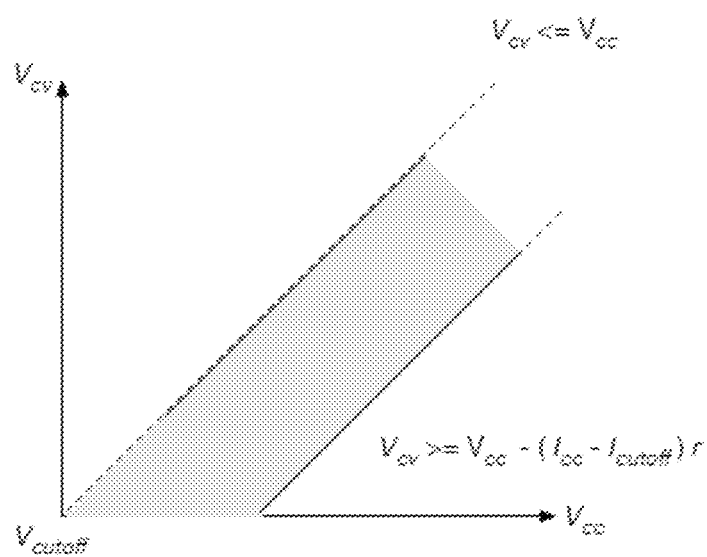
Figure 16D:
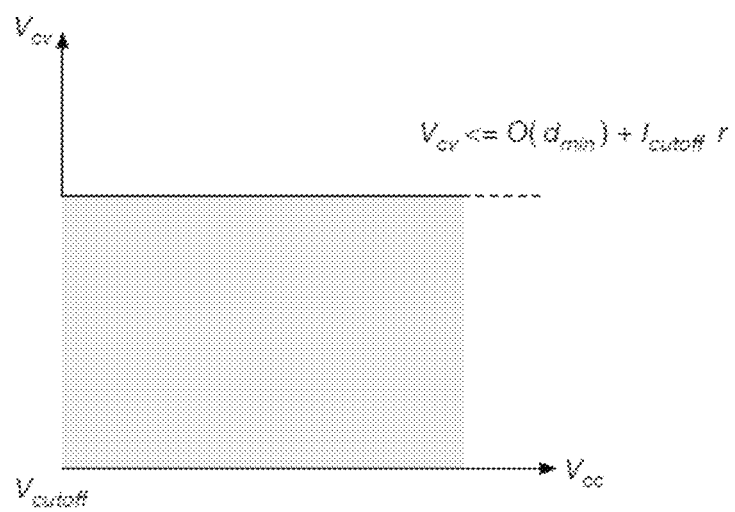
Figure 16E:
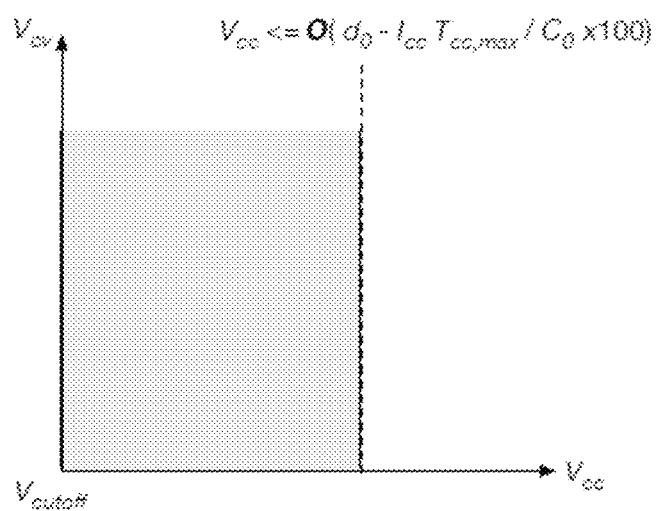
Figure 16F:
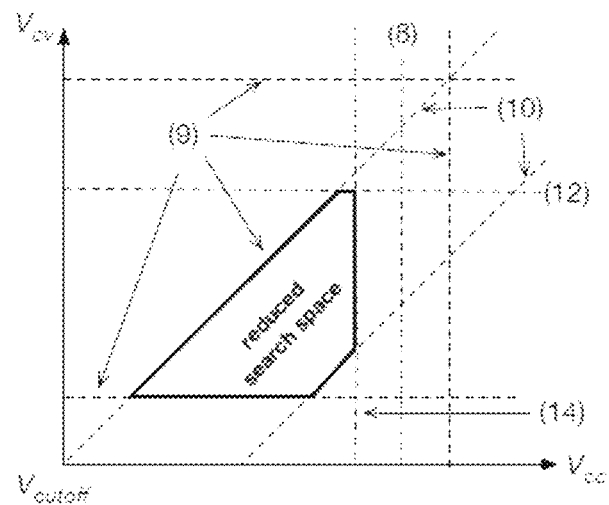

By observing the CV-Chg current trace is convex, another upper bound of $V_{cv}$ can be set. FIG. 15A plots the current when charging a cell with <1,300 mA, 4.1V, 130 mA>$_{cccv}$. The CV-Chg current conforms to a two-term exponential decay process $I_t^{cv} = ae^{b \cdot t} + ce^{d \cdot t}$ for certain a, b, c and d. FIG. 15B plots the corresponding exponentially fitted curve, demonstrating high fitting accuracy, i.e., with error ≤0.15%. To further validate this hypothesis, one applies the two-term exponential fit to 33 empirically collected CV-Chg current traces, and the thus-collected distribution of the goodness-of-fit (in R-Squared) is shown in FIG. 15C. All of these fittings have R-Squared larger than 0.8, and over 70% of them have an R-Squared ≥0.99. These statistics on fitting goodness indicate a good match between the current traces and the fitted curves, validating the hypothesis that the charging current during CV-Chg conforms to a two-term exponential decay process.

Exponential functions are convex, hence showing that the CV-Chg current trace $\{I_1^{cv}, I_2^{cv}, \ldots, I_{T_{cv}}^{cv}\}$ is also convex (note that $I_{T_{cv}}^{cv} = I_{cutoff}$). This way, for any $t \in [1, T_{cv}]$, one knows $$I_t^{cv} \leq \frac{T_{cv} - t}{T_{cv}} I_1^{cv} + \frac{t}{T_{cv}} I_{T_{cv}}^{cv},$$

based on which we have the following upper bound on the capacity charged during CV-Chg:

$$C_{cv} = \int_0^{T_{cv}} I_t^{cv} dt \leq \frac{(I_{cc} + I_{cutoff}) \cdot T_{cv}}{2}. \tag{11}$$

This in turn leads to the following upper bound on the total capacity charged with the proposed user aware charging algorithm $$C_{total} = C_{cc} + C_{cv}$$
$$\leq I_{cc} \cdot T_{cc} + \frac{(I_{cc} + I_{cutoff}) \cdot T_{cv}}{2}$$
$$\leq I_{cc} \cdot T_{cc} + \frac{(I_{cc} + I_{cutoff}) \cdot (T_{available} - T_{cc})}{2}$$
$$\leq \frac{(2 \cdot T_{available} - T_{relax}) \cdot I_{cc} + T_{relax} \cdot I_{cutoff}}{2} = C_{max}.$$

Thus, the lower bound of the cell's DoD after charging it follows as $$d_{min} \geq \max\left\{d_0 - \frac{100 \cdot C_{max}}{C_0}, 0\right\}.$$

Mapping DoD to OCV, one gets $$V_{cv} \leq \mathbb{O}(d_{min}) + I_{cutoff} \cdot r. \tag{12}$$

In one embodiment, the search space is reduced jointly by the constraints (8), (9), (10) and (12) which can be easily identified for any given problem instance.

Figure 17:
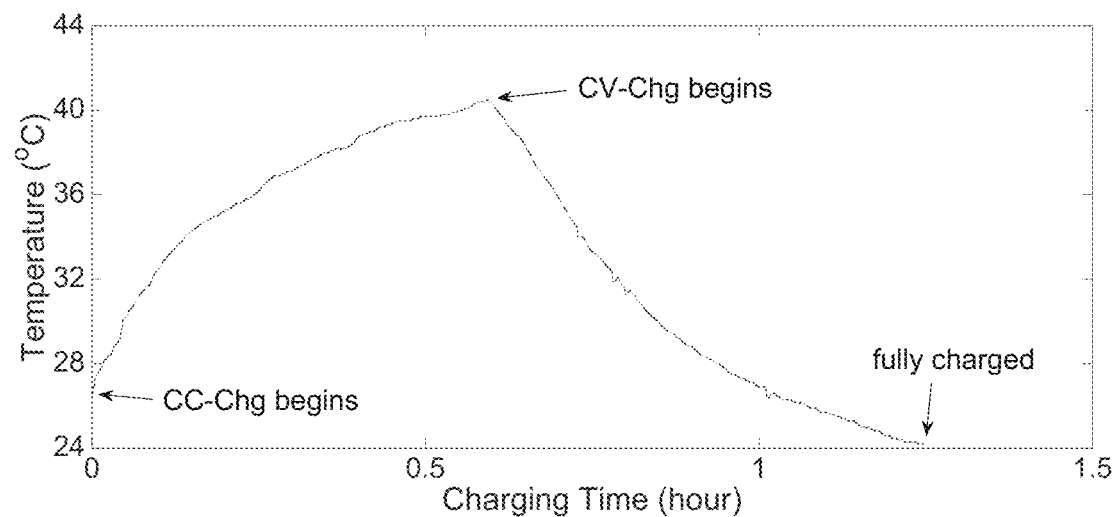
FIG. 17 is a graph depicting battery temperature when charging a mobile device.

In another embodiment, the safe temperature $\theta_{safe}$ imposes another upper bound on $V_{cc}$. FIG. 17 plots the battery temperature when charging a Galaxy S6 Edge phone from completely drained to full, showing the cell temperature increases rapidly during CC-Chg due to the large charging current $I_{cc}$ and then reduces during CV-Chg because of its decreasing charging current. In this way, one can regulate the maximum cell temperature by controlling $V_{cc}$ (and thus the CC-Chg duration), and thus keeping the cell temperature below $\theta_{safe}$ during charging. Also, FIGS. 18A-18C compare the temperature rising when charging the phone multiple times, showing similar temperature rising paths. This implies the feasibility to learn the temperature rising offline and then predict cell temperature during charging. Specifically, for a given system, battery temperature during CC-Chg can be captured by an offline-learned function $$\theta(t) = f(I_{cc}, \theta_0, t),$$

where $\theta_0$ is the initial cell temperature and t is the time since CC-Chg begins. So, the proposed user aware charging method identifies an upper bound of $T_{cc}$ with a pre-defined $\theta_{safe}$ by identifying $$T_{cc,max} = \max\{T_{cc} | \theta(T_{cc}) \leq \theta_{safe}\} \tag{13}$$

which, in turn, facilitates to identify the maximum achievable $V_{cc}$ based on (8):

$$V_{cc} \leq \mathbb{O}\left(d_0 - \frac{I_{cc} T_{cc,max}}{C_0} \times 100\right). \tag{14}$$

The above four facts help further refine the problem formulation as $$\max V_{cv} \tag{15}$$
$$s.t. \ (4), (8), (9), (10), (12) \text{ and } (14).$$

As a result, in this different embodiment, the search space is reduced jointly by the constraints (8), (9), (10) (12) and (14).

Pseudocode for an example embodiment of the algorithm is set forth below. The first step is to estimate the cell resistance r (line 2), with which the reduced search space can be identified. The reduced search space is then identified in the manner set forth above (line 3). With the search space, a guided search is performed to find the optimal $V_{cc}$ and $V_{cv}$ (lines 6-14). More specifically, a top-down search method is employed to search the reduced space. It is intuitive to search the space top-down as one aims to find the largest possible $V_{cv}$. Furthermore, only the rightmost (i.e., largest) $V_{cc}$ needs to be considered when multiple points with the same $V_{cv}$ exist in the search space, because the required charging time $T_{total}$ monotonically decreases as $V_{cc}$ increases with a given $V_{cv}$. Thus, the starting point is values corresponding to the upper right most point in the reduced search space (line 5). Decreasing values for $V_{cv}$ are evaluated sequentially. For each pair of values, a determination is made as to whether the charging process will be completed within the user available time (line 9). If the charging process completes with the user-specified available time, the optimal values have been identified and the process is complete (line 10); otherwise, the value for $V_{cc}$ is reduced at line 13 and the search processing continues. This observation is straightforward as $V_{cv}$ determines the total capacity to be charged, and $V_{cc}$ further determines how much capacity is charged with CC-Chg and CV-Chg, respectively. A larger $V_{cc}$ indicates that more capacity are charged with CC-Chg, increasing the overall charge rate and reducing $T_{total}$. This guided search identifies the optimal $V_{cc}$ and $V_{cv}$ based on the physical facts when charging cells, although it is greedy in nature.

Algorithm 1 Pseudocode of *-AWARE.

1: $V_{cc} = -1$, $V_{cv} = -1$;
2: Estimate resistance r;
3: Identify the reduced search space Z based on (8), (9), (10), (12), and (14);
4: Find $V_{cv,min}$ and $V_{cv,max}$ in Z;
5: $V_{cv,tmp} = V_{cv,max}$;
6: while $V_{cv,tmp} \geq V_{cv,min}$ do
7:     Find the largest $V_{cc,tmp}$ in Z with $V_{cv,tmp}$;
8:     Predict the charging process with $<I_{cc}, V_{cc,tmp}, V_{cv,tmp}, I_{cutoff}>$*-AWARE;
9:     if $T_{cc} + T_{cv} \leq T_{available}$ then
10:         $V_{cc} = V_{cc,tmp}$, $V_{cv} = V_{cv,tmp}$;
11:         break;
12:     else
13:         $V_{cv} = V_{cv} - \delta_v$;
14:     end if
15: end while
16: return $V_{cc}$ and $V_{cv}$;

The overall complexity of user aware charging algorithm is $$\left(\frac{T_{available}}{\delta_t} lg \frac{1}{\delta_v}\right),$$

where the first term accounts for the complexity in predicting the charging process with given $V_{cc}$ and $V_{cv}$, and the second term accounts for the complexity in looking up the OCV-DoD table with an OCV granularity of $\delta_v$. The complexity for $\mathbb{D}(v)$ and $\mathbb{C}(d)$ are $$O\left(lg \frac{V_{max}}{\delta_v}\right),$$

respectively, assuming the table is constructed with OCV as indexes.

Besides the low computational complexity, user-aware charging algorithm is also simple to implement because its control principle is similar to CCCV, which has been widely deployed in both high and low-end systems. FIG. 17A shows the circuit diagram that implements CCCV, where the current source outputs $l_{cc}$ and the voltage source supplies $V_{max}$. The switch position controls whether CC-Chg or CV-Chg should be operational, which is determined based on real-time feedback of cell voltage. On top of this CCCV implementation, user aware charging algorithm poses only one additional requirement for the voltage source to supply $V_{cc}$ first and then $V_{cv}$—an evolution from one single voltage threshold to two voltage thresholds sequentially, and all other circuit logic remains the same.

Figure 3:
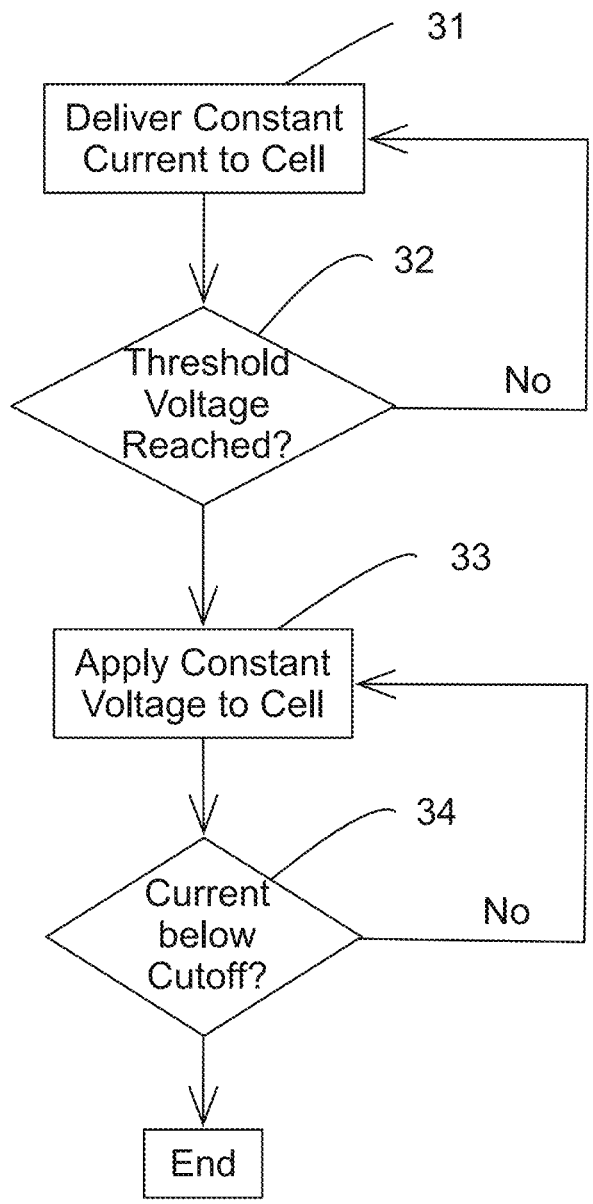
FIG. 3 is a flowchart depicting an example charging algorithm.

FIG. 3 depicts an example implementation of the user-aware charging algorithm. First, a constant current is delivered at 31 to the battery cell. During this phase, a current with a constant magnitude (e.g., 1 Amp) is delivered to the battery cells. In this example, the threshold value is set to $V_{cc}$ as determined in the manner described above. Cell voltage is monitored at 32. The constant current is delivered until the cell voltage reaches a threshold value.

Once the cell voltage reaches the threshold value, a constant voltage is applied to the battery cells as indicated at 33. In this example, the applied voltage is set to $V_{cc}$ as determined in the manner described above. During this phase, the charging current is monitored at 34. When the charging current decreases below a specified cutoff level, voltage is no longer applied to the battery cells and the charging process is complete. It is to be understood that only the relevant steps of the methodology are discussed in relation to FIG. 3, but that other steps may be needed to control and manage the overall charging process.

The proposed user aware charging algorithm was experimentally evaluated. Specifically, the accuracy of user aware charging algorithm in predicting the charging process is verified and then its performance with respect to both the charged capacity and the capacity fading is evaluated.

TENERGY ICR 18650-2600 Lithium-ion cells were used for these experiments; its OCV-DoD table is required for the proposed user aware charging algorithm to predict the charging process. To obtain this OCV-DoD table, a battery tester is used to charge the cells with 200 mA current and record the process, based on which one can identify the relationship between the terminal voltage and DoD of the cells. Resistance compensation is then performed on the thus-collected traces based on Eq. (1) to derive the OCV-DoD table. The small charging current (i.e., 200 mA or 200/2600≈0.077 C) is to reduce the I·r voltage and thus improve the accuracy of the derived OCD-DoD table. The OCV-DoD curves obtained are plotted in FIG. 8B.

Figure 20:
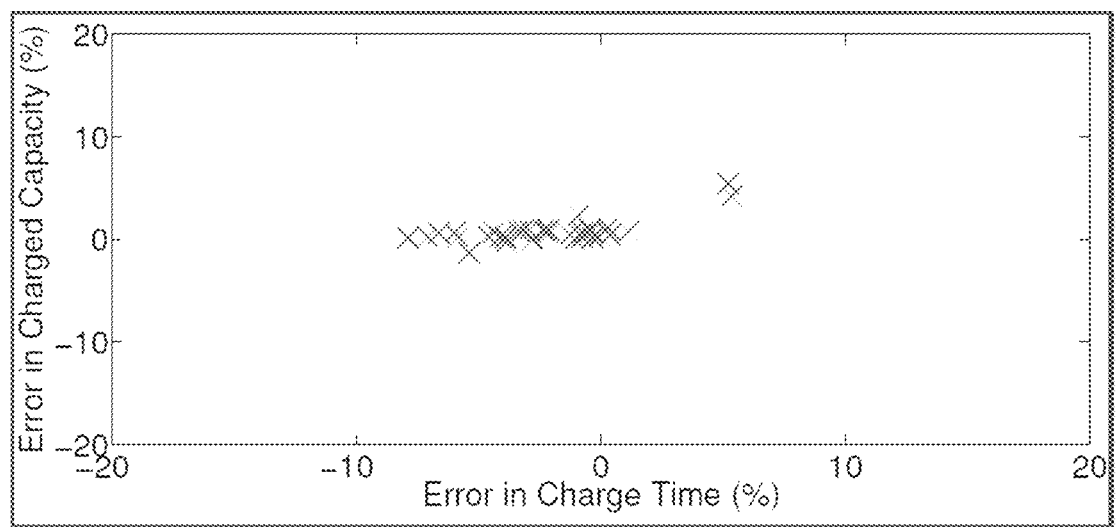
FIG. 20 is a graph showing the prediction accuracy of the proposed user aware charging process.

The accuracy of proposed user aware charging algorithm is verified using the OCV-DoD table. Specifically, 34 charging traces of cells are collected with different voltages and currents, serving as the ground truth. Then, the proposed user aware charging algorithm predicts these charging processes with their corresponding voltages and currents based on the OCV-DoD table. FIG. 20 summarizes the predication accuracy, where the x-axis is the error in predicted charging time and the y-axis is the error in predicted charged capacity. The prediction is found to be pretty accurate—the error in predicting the charged capacity is in the range of [−1.33%, 5.44%] with an average of 0.74%, and that in predicting the charging time is [−7.82%, 5.33%] with an average of −2.26%.

Next, the charged capacity is evaluated with proposed user-aware charging algorithm and compared with the following two baselines; both of which also ensure enough relaxation. First, with G-Fast, the cells are greedily charged with $I_{cc}$ for a time period of $(T_{available}-T_{relax})$—charge cells with the large current $I_{cc}$ as long as possible. Similar to the original CCCV, M-CCCV is described by a triple $<I_{cc}, V'_{max}, I_{cutoff}>_{m-cccv}$. However, M-CCV identifies the optimal $V'_{max}$ to maximize the charged capacity while ensuring enough relaxation, instead of using the fully charged voltage $V_{max}$.

Six case studies were conducted in which cells with different initial OCVs are charged with the three methods. The charging currents are $I_{cc}$=1,300 mA and $I_{cutoff}$=130 mA as specified by the cell manufacturer. The details of these case studies are listed in Table 3 below. Again, the battery tester is used to charge the cells according to these listed profiles.

TABLE 3

Case study details.

| | $T_{available}$ (min) | $T_{relax}$ (min) | Initial OCV (V) | Profile w/ User-Aware | Profile w/ M-CCCV | Profile w/ G-Fast |
|---|---|---|---|---|---|---|
| C-I | 60 | 30 | 3.20 | <1,300, 3.9152, 3.7930, 130> | <1,300, 3.7788, 130> | 1,300 mA for 30 min |
| C-II | 60 | 30 | 3.75 | <1,300, 4.0101, 3.8811, 130> | <1,300, 3.8002, 130> | 1,300 mA for 30 min |
| C-III | 60 | 40 | 3.32 | <1,300, 3.9350, 3.7989, 130> | <1,300, 3.7900, 130> | 1,300 mA for 20 min |
| C-IV | 60 | 40 | 3.45 | <1,300, 3.9000, 3.7887, 130> | <1,300, 3.7800, 130> | 1,300 mA for 20 min |
| C-V | 60 | 40 | 3.57 | <1,300, 3.9701, 3.8082, 130> | <1,300, 3.7800, 130> | 1,300 mA for 20 min |
| C-VI | 60 | 40 | 3.71 | <1,300, 3.9601, 3.8144, 130> | <1,300, 3.7950, 130> | 1,300 mA for 20 min |

Table 4 summarizes the charged capacity in these case studies. The charged capacity with G-Fast can be calculated directly using given $I_{cc}$, $T_{available}$, and $T_{relax}$, e.g., 1,300×(3,600−1,800)/3,600=650 mAh in Case-I. The small variation in the experimental results (i.e., 650.3 mAh vs. 650 mAh) is due to the accuracy of the battery tester in controlling the current (i.e., ±0.1 mA). The proposed user aware charging algorithm outperforms the two baselines by 6.9-50.5%; and improvement ratios of 160% and 290% are observed in Case-II and Case-VI over M-CCCV. This almost 3× improvement over M-CCCV is achieved because in Case-II, the initial OCV (i.e., 3.74V) falls in the range where the DoDs are highly sensitive to OCVs. Recall that in M-CCCV, CV-Chg is responsible to charge the cell in the OCV range [$V_{max}−I_{cc}·r$, $V_{max}−I_{cutoff}·r$], which corresponds to a wide range of DoDs in Case-II. This means that the CV-Chg is responsible for charging more capacity to cells and thus requires more time. As a result, the CC-Chg phase is short and the overall charged capacity is limited. These results further reinforce the necessity to separate the control over CC-Chg and CV-Chg, as in the proposed charging algorithm.

TABLE 4

The effect of user Experiment results on charged capacity.

| | Charged Capacity (mAh) | | | Improvement Ratio (%) | |
|---|---|---|---|---|---|
| | User-Aware | M-CCCV | G-Fast | over M-CCCV | over G-Fast |
| C-I | 703.3 | 589.3 | 650.4 | 19.3 | 8.1 |
| C-II | 743.6 | 188.8 | 650.3 | 293.9 | 14.4 |
| C-III | 578.0 | 521.6 | 433.6 | 10.8 | 33.3 |
| C-IV | 567.9 | 531.3 | 433.0 | 6.9 | 31.2 |
| C-V | 533.8 | 354.8 | 433.5 | 50.5 | 23.1 |
| C-VI | 562.2 | 215.4 | 433.3 | 161 | 29.7 |

Figure 21:
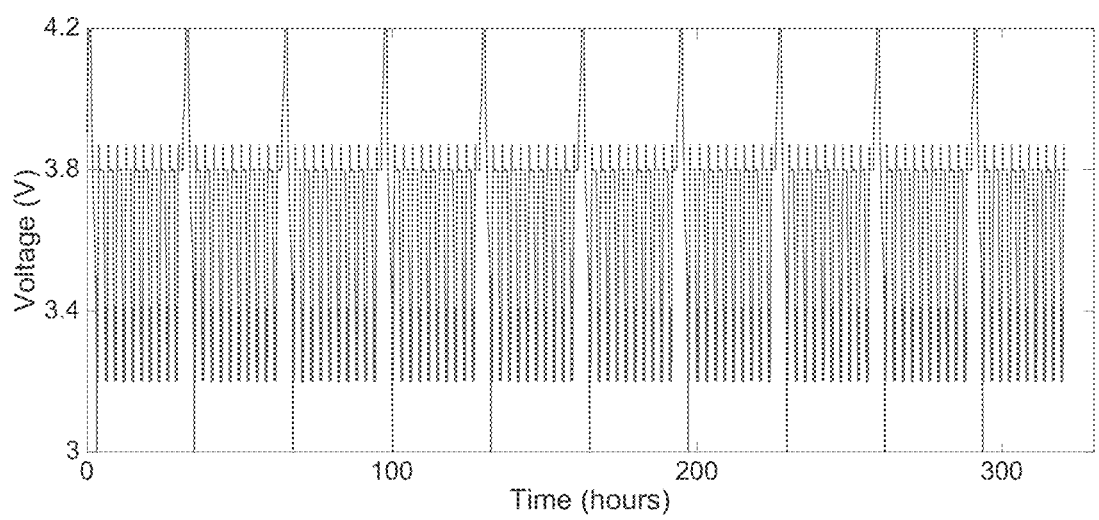
FIG. 21 is a graph showing cycling test for the proposed user aware charging process.
Figure 22:
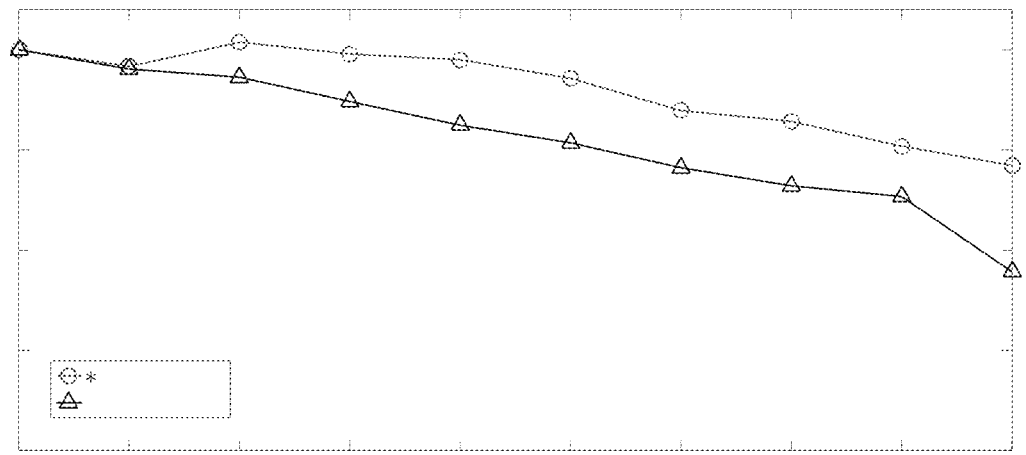
FIG. 22 is a graph showing capacity fading for the proposed user aware charging process.

The effect of user-aware charging algorithm in slowing down the capacity fading of cells with cycles was also evaluated. Specifically, repeat Case-I in Table 3 for 100 cycles with user-aware charging algorithm and fast charging, respectively. The cells are charged with 1,300 mA current for 1 hour and then discharged to 3.20V in each of the cycles with fast charging. Fully charge and discharge the cells every 10 cycles to collect their total deliverable capacities. Six cells are used in these cycling tests, and FIG. 21 shows an exemplary voltage trace when cycling with user-aware charging algorithm. FIG. 22 plots the averaged capacity fading during these cycling tests. The cell capacity fades to 99.44% with user-aware charging algorithm and to 98.89% when fast charging is used.

Moreover, 92,884.0 mAh capacity is delivered on average during the user-aware charging algorithm-based cycling tests as compared with fast charging having 140, 835.0 mAh. Normalizing the delivered capacity with the capacity fading ratios, one finds that the cell capacity degrades 1% after delivering 165, 860 mAh capacity when cycling with user-aware charging algorithm, while that with fast charging is only 127, 150 mAh. These two comparisons show that the proposed user-aware charging algorithm not only slows down the capacity fading of the cells by $$1 - \frac{1 - 0.9944}{1 - 0.9889} = 49.55\%,$$

but more importantly, also increases the total capacity the cells deliver during their lifetime by $$\frac{165,860 - 127,150}{127,150} = 30.45\%.$$

Pursuing fast charge is not always needed and accelerates the capacity fading of cells due to its inability to rest cells after charge. In this disclosure, we have tackled the cell charging problem from a new perspective. Specifically, a proposed user-aware charging algorithm is presented that maximizes the charged capacity within a user-specified available charge time while ensuring enough relaxation for cells to slow down their capacity fading. Extensive experiments and trace-driven emulations have shown that user-aware charging algorithm increases the charged capacity by 6.9-50.5% and up to 3× in certain extreme cases, and slows down the capacity fading of cells by 49.55%.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real-time network operating systems.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Figure 23:
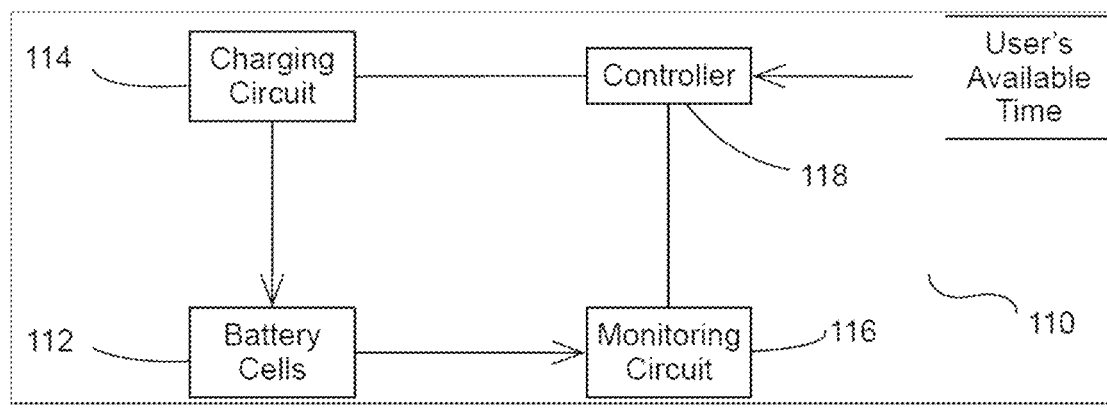
FIG. 23 is a block diagram depicting an example system for charging battery cells.

The present disclosure also relates to an apparatus for performing the operations herein. FIG. 23 depicts an example system 110 for charging one or more battery cells 112. The system 110 is comprised of a charging circuit 114, a monitoring circuit 116 and a controller 118. The charging circuit 114 operates to deliver a constant current and/or a constant voltage to the battery cells. The monitoring circuit 116 monitors the amount of charge held by the battery cells as well as other parameters indicative of the state of the battery cells and/or the charging process. Different constructs for such circuits 114, 116 are readily known in the art. Based on the information received from the monitoring circuit 116, the controller 118 determines the quantity and duration of the current and/or voltage to be applied to the battery cells, for example using the algorithm set forth above. The controller 118 in turn interacts with the charging circuit 114 to deliver the current and/or voltage to the battery cells. In some embodiments, these system components are packaged together in a housing of a charging device.

In some embodiments, the controller 118 may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for charging a battery cell having lithium-ion composition, comprising:
   receiving a user available time in which the battery cell is to be charged;
   determining a current charging time period for charging the battery cell with a constant current by subtracting a predefined time period for relaxing the battery cell after charging the battery cell from the user available time;
   after determining the current charging time period, selecting a threshold voltage to which the battery cell is to be charged with the constant current using the current charging time period and a maximum safe temperature of the battery, where the threshold voltage is less than a maximum voltage to which the battery cell can be charged to; and
   delivering a constant current to the battery cell until cell voltage of the battery cell reaches the threshold voltage.

2. The method of claim 1 further comprises
   detecting occurrence of the cell voltage of the battery cell reaching the threshold voltage; and
   cease delivery of the constant current to the battery cell in response to detecting that the cell voltage equals the threshold voltage.

3. The method of claim 1 further comprises
   determining a secondary voltage which is to be applied to the battery cell during a secondary charging phase, where the secondary voltage is constrained by the available time period and the secondary voltage is less than a maximum voltage to which the battery cell can be charged to; and
   applying the secondary voltage to the battery cell until charging current for the battery cell falls below a cutoff limit, where the secondary voltage is applied in response to detecting that the cell voltage equals the threshold voltage.

4. The method of claim 1 wherein determining a threshold voltage further comprises determining the largest possible threshold voltage that the charging of battery cell finishes within the user available time.

5. The method of claim 1 wherein determining a threshold voltage further comprises determining the largest possible threshold voltage that the charging of battery cell finishes while keeping the cell temperature below a maximum safe level.

6. The method of claim 1 wherein determining a threshold voltage further comprises
   determining cell resistance of the battery cell;
   defining a search space from which to determine the threshold voltage based on the determined cell resistance; and
   searching the search space to identifying the threshold voltage.

7. The method of claim 6 further comprises searching the search space to identify a value for a constant voltage being applied to the battery cell.

8. The method of claim 7 further comprises
   predicting the charging process using the identified threshold voltage and the identified value for the constant voltage, including an expected amount of time for delivering a constant current and an expected amount of time for delivering the constant voltage;
   determining whether sum of the expected amount of time for delivering a constant current and the expected amount of time for delivering the constant voltage exceeds an anticipated charging time; and
   lowering the value for the constant voltage in response to a determination that the sum of the expected amount of time for delivering a constant current and the expected amount of time for delivering the constant voltage exceeds the anticipated charging time.

9. A method for charging a battery cell having lithium-ion composition, comprising:
   receiving, by a controller, an user available time in which the battery cell is to be charged;
   determining, by the controller, a current charging time period for charging the battery cell with a constant current, where the determination of the current charging time period is a mathematical function of the user available time and a predefined time period for relaxing the battery cell;
   after determining the current charging time period, determining, by the controller, a threshold voltage to which the battery cell is to be charged with the constant current, where the determination of the threshold voltage is constrained by the current charging time period and the threshold voltage is less than a maximum voltage to which the battery cell can be charged to;

determining, by the controller, a secondary voltage which is to be applied to the battery cell during a secondary charging phase, where the secondary voltage is constrained by the available time period and the secondary voltage is less than a maximum voltage to which the battery cell can be charged to; and charging the battery cell in part based on the threshold voltage and the secondary voltage.

10. The method of claim 9 wherein determining the current charging time period by subtracting the predefined time period for relaxing the battery cell from the user available time.

11. The method of claim 9 wherein determining a threshold voltage further comprises determining the largest possible threshold voltage that the charging of battery cell finishes within the user available time.

12. The method of claim 9 wherein determining a threshold voltage further comprises determining the largest possible threshold voltage that the charging of battery cell finishes while keeping the cell temperature below a maximum safe level.

13. The method of claim 9 wherein determining a threshold voltage further comprises
determining cell resistance of the battery cell;
defining a search space from which to determine the threshold voltage based on the determined cell resistance; and
searching the search space to identifying the threshold voltage.

14. The method of claim 13 further comprises searching the search space to identify a value for the secondary voltage being applied to the battery cell.

15. The method of claim 14 further comprises
predicting the charging process using the identified threshold voltage and the identified value for the constant voltage, including an expected amount of time for delivering a constant current and an expected amount of time for delivering the constant voltage;
determining whether sum of the expected amount of time for delivering a constant current and the expected amount of time for delivering the constant voltage exceeds an anticipated charging time; and
lowering the value for the constant voltage in response to a determination that the sum of the expected amount of time for delivering a constant current and the expected amount of time for delivering the constant voltage exceeds the anticipated charging time.

16. A method for charging a battery cell having lithium-ion composition, comprising:
receiving an user available time in which the battery cell is to be charged;
determining a current charging time period for charging the battery cell with a constant current, where the determination of the current charging time period is a mathematical function of the user available time and a predefined time period for relaxing the battery cell after charging the battery cell;
after determining the current charging time period, determining a threshold voltage to which the battery cell is to be charged with the constant current, where the determination of the threshold voltage is constrained by the current charging time period and a maximum safe temperature of the battery, wherein the threshold voltage is less than a maximum voltage to which the battery cell can be charged to; and
delivering a constant current to the battery cell until cell voltage of the battery cell reaches the threshold voltage.

* * * * *